United States Patent
Mott

(10) Patent No.: US 7,486,689 B1
(45) Date of Patent: *Feb. 3, 2009

(54) SYSTEM AND METHOD FOR MAPPING INFINIBAND COMMUNICATIONS TO AN EXTERNAL PORT, WITH COMBINED BUFFERING OF VIRTUAL LANES AND QUEUE PAIRS

(75) Inventor: James A. Mott, Oakland, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 764 days.

This patent is subject to a terminal disclaimer.

(21) Appl. No.: 10/812,200

(22) Filed: Mar. 29, 2004

(51) Int. Cl.
*H04L 12/56* (2006.01)
(52) U.S. Cl. .................. 370/412; 710/313
(58) Field of Classification Search ........... 709/227, 709/228; 710/308; 370/412
See application file for complete search history.

(56) References Cited

U.S. PATENT DOCUMENTS

| | | | |
|---|---|---|---|
| 6,490,279 B1 * | 12/2002 | Chen et al. ............... 370/392 |
| 6,854,072 B1 * | 2/2005 | Cagle et al. .............. 714/15 |
| 6,928,508 B2 * | 8/2005 | Tse ......................... 710/313 |
| 7,010,607 B1 * | 3/2006 | Bunton .................... 709/228 |
| 7,039,057 B1 * | 5/2006 | Acharya et al. ......... 370/395.51 |
| 7,076,569 B1 * | 7/2006 | Bailey et al. ............ 709/250 |
| 7,089,281 B1 * | 8/2006 | Kazemi et al. .......... 709/203 |
| 7,092,401 B2 * | 8/2006 | Craddock et al. ....... 370/412 |
| 7,107,359 B1 * | 9/2006 | Burton et al. ........... 709/250 |
| 7,142,540 B2 * | 11/2006 | Hendel et al. ........... 370/392 |
| 7,165,110 B2 * | 1/2007 | Neal et al. ............... 709/227 |
| 7,213,106 B1 * | 5/2007 | Koster et al. ............ 711/119 |
| 7,237,031 B2 * | 6/2007 | Cheng ..................... 709/230 |
| 7,239,642 B1 * | 7/2007 | Chinn et al. ............. 370/401 |
| 2002/0129123 A1 * | 9/2002 | Johnson et al. .......... 709/219 |
| 2003/0046474 A1 * | 3/2003 | Craddock et al. ....... 710/308 |
| 2003/0118053 A1 * | 6/2003 | Edsall et al. ............. 370/474 |
| 2003/0169690 A1 * | 9/2003 | Mott ....................... 370/238 |
| 2003/0172149 A1 * | 9/2003 | Edsall et al. ............. 709/224 |
| 2004/0024833 A1 * | 2/2004 | Siddabathuni ........... 709/212 |
| 2004/0081108 A1 * | 4/2004 | Kloth et al. .............. 370/299 |
| 2004/0264472 A1 * | 12/2004 | Oliver et al. ............. 370/395.4 |
| 2005/0021699 A1 * | 1/2005 | Kota et al. ............... 709/221 |
| 2005/0129039 A1 * | 6/2005 | Biran et al. .............. 370/412 |
| 2006/0203846 A1 * | 9/2006 | Davis ...................... 370/466 |
| 2006/0259644 A1 * | 11/2006 | Boyd et al. .............. 709/250 |

* cited by examiner

*Primary Examiner*—Thong H Vu
(74) *Attorney, Agent, or Firm*—Park, Vaughan & Fleming LLP

(57) ABSTRACT

A system and method for mapping outbound communications (e.g., encapsulated Ethernet packets) from InfiniBand queue pairs (QP) and/or virtual lanes (VL) to ports through which they are to be transmitted to an external communication system. A memory is shared between the InfiniBand receive side and transmit side. A shared control structure facilitates management of a linked list for each queue pair. A linked list is composed of entries in the control structure; each entry stores a value identifying the next control entry in the list and a memory bucket associated with the entry. Each queue pair terminating has a head pointer identifying the first control entry and memory bucket, and a tail pointer identifying the last control entry and memory bucket of a linked list. When a communication is reassembled, pointers defining a sub-list comprising the communication are passed to a network transmit module.

45 Claims, 12 Drawing Sheets

SYSTEM AND METHOD FOR MAPPING INFINIBAND COMMUNICATIONS TO AN EXTERNAL PORT, WITH COMBINED BUFFERING OF VIRTUAL LANES AND QUEUE PAIRS

BACKGROUND

This invention relates to the field of computer systems. More particularly, a system and methods are provided for mapping or transferring traffic received via an InfiniBand queue pair to an external communication system or component (e.g., an Ethernet network).

InfiniBand™ technology provides a flexible, scalable architecture for interconnecting servers, communication networks, storage components and other systems and devices. Computing and storage nodes have become distributed throughout many organizations' computing environments, and the InfiniBand architecture provides means for interconnecting those elements and others. For example, InfiniBand channel adapters can be used as bridges between an InfiniBand fabric and external communication systems or networks.

In the InfiniBand architecture, a queue pair (QP) defines an end-to-end connection between two nodes (e.g., servers, input/output components) at the transport protocol layer. A virtual lane (VL) operates at the link layer, and defines single-hop connections (e.g., between two switches, between a switch and a node). Each virtual lane has an associated service level indicating a quality of service to be afforded the traffic within that virtual lane. When an InfiniBand packet is communicated, it is communicated as part of a specific queue pair, which is assigned membership in a virtual lane for each hop. The virtual lanes used for different hops may vary, but the different virtual lanes may be associated with the same service level.

Queue pairs are flow-controlled by the receiving end of the end-to-end connection. Virtual lanes are flow-controlled by the receiving end of each hop. In particular, a node that receives traffic via an end-to-end connection or single hop may issue credits allowing the transmitting end (of the connection or hop) to send a specified amount of traffic.

A QP credit is generally issued for each message (e.g., one credit equals one message of up to $2^{32}$ bytes), and each message may be segmented into one or more InfiniBand packets. For example, one message may correspond to one Ethernet packet to be encapsulated in one or more InfiniBand packets and passed to an external network. VL credits are generally in the form of blocks (e.g., sixty-four bytes per credit). When the receiving end of a QP or VL issues a credit, it is generally understood that an amount of storage space sufficient to store the corresponding amount of traffic will be available when the traffic is received. If storage space is not available, the QP at the receiving end may instruct the sender to retry the communication later. A VL reports a flow control error and then drops the packet.

The InfiniBand specification implies that each QP and each VL should be serviced at its receiving end by a separate FIFO (First-In, First-Out) queue. However, providing dedicated queues requires each queue pair and virtual lane to be provided with worst-case buffering to accept a maximum burst of traffic. This scheme results in an inefficient use of memory space because, at any given time, not every active QP or VL will even be configured, much less receiving enough traffic to require a full set of buffers, and therefore storage space dedicated to a particular (e.g., non-busy) QP or VL may be wasted. Thus, a need exists for a system and method for sharing buffers between multiple queue pairs or multiple virtual lanes, and/or between queue pairs and virtual lanes.

A shared storage space for virtual lane and queue pair traffic may allow more flexibility and scalability, but it would still be necessary to support flow control. For example, with shared storage space, the amount of storage used by each VL and QP should be tracked in order to calculate how many credits the receiving end can or should issue. Depending on whether any storage space is dedicated to a queue pair or virtual lane, or how much shared space is available for use by any queue pair or virtual lane, supporting flow control may become problematic. Thus, there is a need for a system and method for facilitating flow control in association with a memory configured for shared buffering of queue pairs and/or virtual lanes.

Further, at an interconnection between an InfiniBand fabric and an external system (e.g., an Ethernet network or other communication system), the use of discrete FIFO queues for each terminating QP (and/or VL) means that traffic to be transferred from a QP to the external system must be copied from its InfiniBand QP queue into a different queue or data structure for the external system (e.g., a network transmit module) before the traffic can be transmitted externally. This delays the transfer and causes additional inefficiency. Thus, there is a need for a system and method for avoiding inefficient memory operations when transferring communications between InfiniBand and an external system.

Also, if a single receive queue is used to store mixed types of traffic for a queue pair or other type of communication connection, a system and method are needed for interleaving the different types of traffic while avoiding the possibility of transferring traffic out of order. For example, a queue pair's traffic may include Send commands containing encapsulated outbound communications (e.g., Ethernet packets), Send commands containing RDMA Read descriptors (e.g., for retrieving outbound communications), responses to RDMA Reads, etc. Thus, different types of traffic should be handled without causing out of order processing of outbound communications.

A system and method are also needed to track responses to RDMA Read operations, so that a corresponding entry in a retry queue can be retired when all responses are received.

SUMMARY

A system and method are provided for mapping outbound communications from InfiniBand queue pairs (QP) and/or virtual lanes (VL) to ports through which they are to be transmitted to an external communication system (e.g., an Ethernet network). In a channel adapter or other interface device, a memory is shared between the InfiniBand receive side (i.e., where packets are received from the InfiniBand fabric) and the transmit side (i.e., where communications are transmitted to the external system).

In one embodiment of the invention, each queue pair terminating at the channel adapter has an associated set of pointers or registers identifying the beginning and end of a linked list for storing contents of InfiniBand packets in the shared memory. Thus, an encapsulated communication (e.g., an encapsulated Ethernet packet) is reassembled in the shared memory, as it is received, by chaining together as many shared memory buckets as are needed for the communication.

A shared control structure facilitates management of the linked list. Illustratively, the linked list is composed of entries in the control structure, wherein each entry stores a value identifying both the next control entry in the list and a memory "bucket" associated with the entry. Each queue pair's pointers include a head pointer identifying the first control entry and memory bucket, and a tail pointer identifying the last control entry and memory bucket in the queue pair's linked list.

When a communication is reassembled in the shared memory, pointers identifying the corresponding sub-linked list are transferred to an outbound port (e.g., a port for transmitting the communication onto an external system or communication link). For example, pointers identifying the beginning (i.e., first control entry and first memory bucket) and end (i.e., last control entry and last memory bucket) of the communication may be passed to a network transmit module. The pointers may be re-linked, possibly in a new order, to populate a linked list for the outbound port. Thus, the shared memory is used to queue not only incoming InfiniBand traffic, but also outgoing traffic. One result is that it is unnecessary to copy an outgoing communication between inbound and outbound queues.

DETAILED DESCRIPTION

Figure 1:
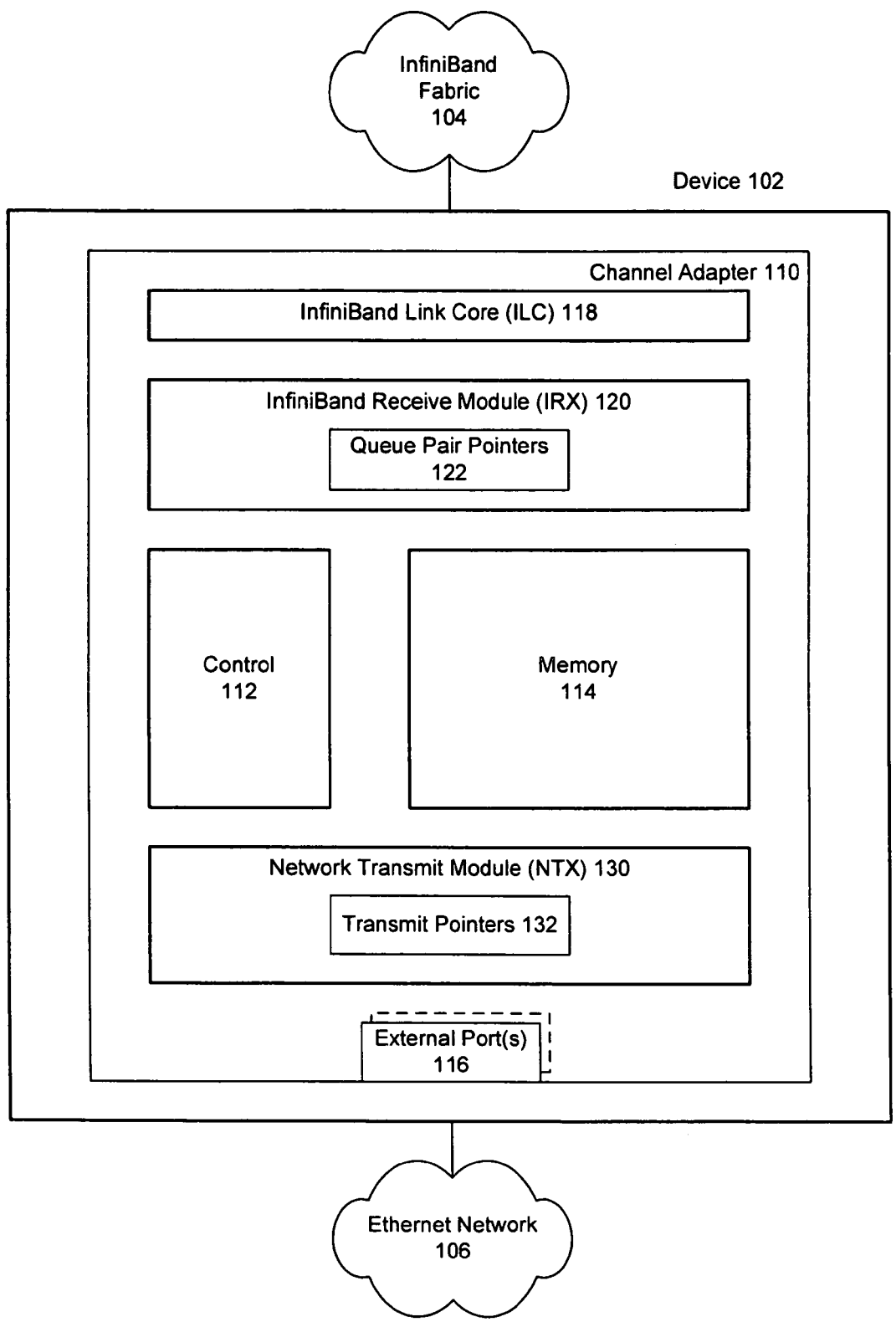
FIG. 1 is a block diagram depicting a computing device in which traffic received from multiple queue pairs and virtual lanes are buffered in a single shared memory, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of techniques. For example, the methods described herein may be implemented in software executing on a computer system, or implemented in hardware utilizing either a combination of microprocessors or other specially designed applications specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

Introduction

In one embodiment of the invention, a system and method are provided for buffering traffic received via InfiniBand queue pairs (QP) and virtual lanes (VL) in a single shared memory structure. Memory buckets or elements are dynamically allocated as needed. For each active queue pair, a linked list of memory buckets is formed for storing traffic from that queue pair. Thus, instead of a fixed number of queues or fixed-size, dedicated queues (e.g., FIFO queues), each QP has a dynamically sized linked list that can be reconfigured to support varying numbers of virtual lanes and queue pairs, and each resulting linked list can be easily measured and manipulated. Each queue pair's virtual lane membership is noted, thereby facilitating measurement of the amount of traffic in the shared memory for each active virtual lane.

In another embodiment of the invention, a system and method are provided for facilitating flow control of queue pairs and/or virtual lanes, wherein the queue pair and virtual lane traffic is buffered in a shared memory structure. In this embodiment, depths of the queue pairs and virtual lanes are measured, and a decision whether to accept a new packet, or issue a credit, may be made on the basis of whether there is sufficient room in the shared memory structure for the packet's queue pair or virtual lane.

In yet another embodiment of the invention, a system and method are provided for sharing a memory between the receiving end of InfiniBand network communication connections (e.g., queue pairs, virtual lanes) and the transmitting end of a communication network system or link external to the InfiniBand network (e.g., an Ethernet network). The memory may be used for combined buffering of receive queue pairs and/or virtual lanes via linked lists, but also comprises linked lists for one or more outbound ports. A communication can be queued for transmission (e.g., after being reassembled in the shared memory) by simply copying, moving or re-arranging pointer or register values, rather than copying the entire communication.

In another embodiment of the invention, a system and method are provided for mixing traffic having different transfer protocols in one queue, while avoiding out-of-order processing of the traffic. The queue may be for an InfiniBand queue pair, and may be implemented as one or more linked lists. For example, such a queue may store Send commands encapsulating outbound communications and Send commands encapsulating RDMA (Remote Direct Memory Access) Read descriptors for retrieving outbound communications. Each command is processed, and its associated communication (e.g., an Ethernet packet) forwarded for transmission, in order.

In another embodiment of the invention, a system and method are provided for tracking responses to an RDMA Read operation. Illustratively, linked lists may be maintained for different queue pairs, with each linked list entry storing the range of Packet Sequence Numbers (PSN) associated with the expected responses to the RDMA Read. When the last response is received, the linked list entry may be removed.

Embodiments of the invention are described below as they may be implemented for InfiniBand traffic traversing queue pairs and virtual lanes. Other embodiments of the invention may be configured and implemented for other types of communication architectures or protocols, such as PCI (Peripheral Component Interconnect) Express, Asynchronous Transfer Mode (ATM), Ethernet and, in general, any packetized data transfer scheme that multiplexes different independent packet streams onto a shared medium using "Send" or RDMA protocols.

Combined Buffering of Virtual Lanes and Queue Pairs

In one embodiment of the invention, a shared memory structure is used to store traffic received at a computing device from an InfiniBand fabric or network. The memory structure is shared among multiple queue pairs that define end-to-end connections between the computing device and other InfiniBand nodes. The queue pairs may be members of any virtual lane(s) reaching the computing device. The shared memory structure is managed as a set of linked lists maintained outside the shared memory structure, thereby allowing traffic from multiple queue pairs and/or virtual lanes to be stored and reassembled in the same structure simultaneously. Thus, there is no need to maintain separate and/or dedicated memory structures for each queue pair and/or virtual lane. In one implementation, the traffic is transmitted from the same structure after being reassembled into an outgoing communication (e.g., an Ethernet packet).

In this embodiment, the amount of traffic stored for a given queue pair at a particular time may be measured by examining that queue pair's linked list. A determination of the amount of traffic in the shared memory for one virtual lane may be facilitated by monitoring the virtual lane membership of each queue pair and accumulating the sizes of the linked lists for each queue pair in the virtual lane.

FIG. 1 is a block diagram of a computing device in which this and other embodiments of the invention may be implemented. Although these embodiments are described as they may be configured for transferring communications between an InfiniBand fabric and an Ethernet network, other embodiments may be configured for interfacing between other types of communication networks, systems or components, such as SONET (Synchronous Optical Network) for Internet Protocol (IP), POS (Packet over SONET), PCI Express or SONET/SDH (Synchronous Digital Hierarchy).

In FIG. 1, computing or communication device 102 is coupled to InfiniBand fabric 104, and is also coupled to Ethernet network 106 or some other external communication system or component. Any number of virtual lanes may be configured to be active between device 102 and switches or other link partners within fabric 104. Similarly, any number of queue pairs may be configured to be active between device 102 (or components of device 102) and other nodes within the InfiniBand fabric. The queue pairs may be reliable connected queue pairs (RCQPs).

Device 102 includes channel adapter 110 (e.g., a target channel adapter), which is configured for communication with nodes within InfiniBand fabric 104. Channel adapter 110 comprises control 112, memory 114, InfiniBand Link Core 118, InfiniBand Receive Module (IRX) 120, Network Transmit Module (NTX) 130 and external port(s) 116. IRX 120 includes queue pair pointers 122 for queue pairs' linked lists, while NTX 130 includes transmit pointers 132 associated with queues for external ports 116. Through external port(s) 116, channel adapter 110 can transmit Ethernet packets and/or other communications onto network 106.

InfiniBand Link Core 118 performs link-level flow control using credit information, as described below.

IRX 120 handles incoming packets from InfiniBand fabric 104. Queue pair pointers 122 comprise registers or pointers for managing queues for each active queue pair. As described below, a queue pair's queue may comprise linked lists of entries in control 112 and memory 114. A queue pair's linked list is used to manage the reassembly, in memory 114, of segmented outbound communications from the contents of one or more InfiniBand packets processed by IRX 120. IRX 120 also stores queue pair state information (possibly with queue pair pointers 122) and virtual lane state information. Further details of an InfiniBand Receive Module are described below, in conjunction with FIG. 4.

NTX 130 processes outbound communications after they are reassembled in memory 114, for transmission via an external port 116. An external port may offer Quality of Service (QoS) options by maintaining separate output queues for each defined QoS; access to the queues may be arbitrated via weighted fair queuing or other arbitration schemes.

Illustratively, transmit pointers 132 correspond to one or more linked lists of reassembled communications awaiting transmission. For example, for each queue (e.g., QoS queue) of an external port, transmit pointers 132 may include a separate set of registers or pointers for managing a linked list (within control 112 and memory 114) of communications awaiting transmission. Methods of transferring outbound communications between InfiniBand fabric 104 and network 106, through a channel adapter such as channel adapter 110, are discussed in a following section.

In one implementation of the embodiment of the invention depicted in FIG. 1, channel adapter 110 is capable of operating in any of two or more modes. In one mode, a single external port 116 is operated at a data rate of approximately 10 Gbps. In another mode, multiple (e.g., 4) external ports 116 are operated, each at a data rate of approximately 1 Gbps.

In the illustrated embodiment of the invention, as InfiniBand packets are received at computing device 102, over various queue pairs and virtual lanes, contents of the packets are stored or reassembled via memory 114 and control 112. Thus, one contiguous memory structure (i.e., memory 114) is used to buffer packets for multiple queue pairs and virtual lanes, rather than implementing a separate structure (e.g., FIFO queues) for each.

In this embodiment of the invention, control 112, memory 114, IRX 120 and NTX 130 reside on one chip or integrated circuit (e.g., an ASIC). In other embodiments, multiple chips may be used and/or the illustrated elements of the channel adapter may be configured differently.

Figure 2:
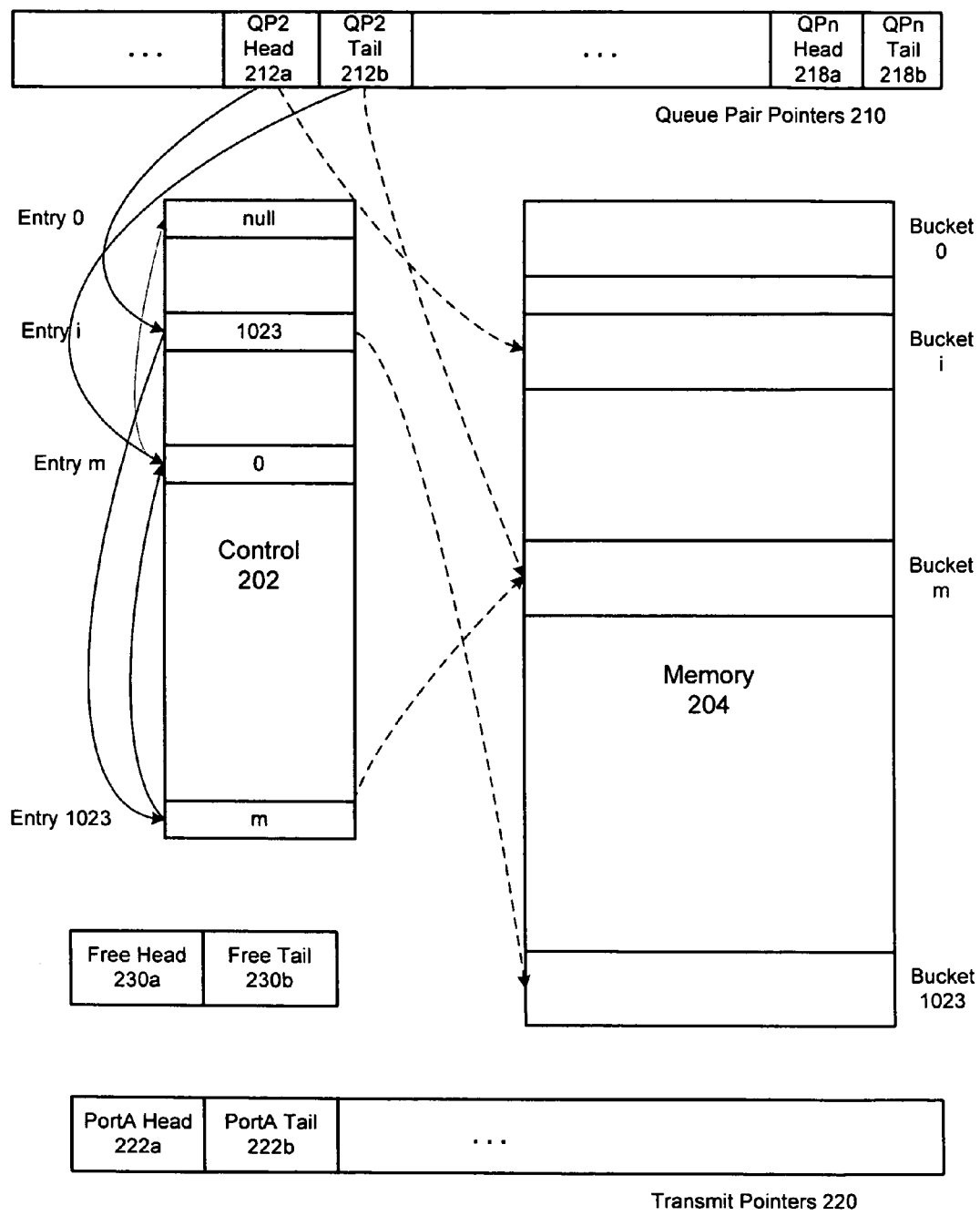
FIG. 2 is a block diagram of memory structures for facilitating the combined buffering of queue pair and virtual lane traffic, in accordance with an embodiment of the invention.

FIG. 2 depicts details of a channel adapter such as channel adapter 110 of FIG. 1 in greater detail, according to one embodiment of the invention. Although the outbound path of communications (i.e., from InfiniBand to an external system) is discussed herein, the channel adapter is also configured to handle incoming communications (i.e., from the external system to the InfiniBand fabric).

In FIG. 2, memory 204 is a memory structure (e.g., a multi-port RAM) configured to store traffic received via various queue pairs and virtual lanes, from any number of InfiniBand nodes and link partners, for reassembly into communications destined for an external communication system or component. Each queue pair's traffic may be stored as a linked list of memory locations. Control 202 is a separate memory or data structure for managing linked lists of each queue pair's traffic stored in memory 204.

Illustratively, the traffic comprises contents of InfiniBand packets configured to carry encapsulated Ethernet packets from InfiniBand nodes for transmission on the external system. The packets may include InfiniBand Send commands (encapsulating Ethernet packet segments or RDMA Read descriptors), RDMA Read commands and/or other types of packets.

For each queue pair that is active on the channel adapter, queue pair pointers 210 include (at least) a head and tail pointer to identify the beginning and end of the queue pair's linked list. Thus, QP2 head 212a and QP2 tail 212b are pointers for a linked list associated with a particular queue pair. Similarly, transmit pointers 220 includes a set of head and tail pointers for each queue of an outbound port. Queue pair pointers 210 and/or transmit pointers 220 may be stored in registers or other structures. Other information may also be stored for each queue pair or outbound queue, such as the virtual lane that a queue pair belongs to, other pointers, etc.

Each queue pair's and outbound queue's linked list comprises a series of corresponding entries in control 202 and associated memory buckets in memory 204. A set of memory buckets in memory 204 corresponding to a particular linked list may be considered to constitute a queue (e.g., for the associated queue pair and/or virtual lane). A "bucket" in this context comprises a set of lines in a RAM that have a common value for their most significant address bits. The number of other, least significant, address bits may determine the size of a bucket (i.e., the number of lines or bytes in the bucket).

Control 202 and memory 204 may include an equal number of entries. Thus, in the implementation depicted in FIG. 2, control 202 comprises 1,024 (1K) entries, and memory 204 comprises 1,024 (1K) buckets. Each control entry includes a 10-bit value, which is used to identify the next control entry in the linked list and the corresponding next bucket. A control entry may also contain other information (e.g., an ECC code).

The control structure may be protected by a number of techniques, used in combination or separately. These techniques may include physical separation of bits in the same control entry in order to prevent double bit errors, implementation of a SECDED (Single Error Correct, Double Error Detect) Error Correction Code (ECC), etc. The SECDED code protection can be extended to include the address of the control structure entry, thereby protecting the data from being written or read from the wrong location due to an addressing error while accessing the control structure.

In FIG. 2, each data line in memory 204 is 128 bits (16 bytes) wide, and each bucket includes eight lines. Thus, the bucket size is 128 bytes, and the size of memory 204 is 128 Kbytes.

In other embodiments of the invention, control 202 and memory 204 may be of virtually any size and the configuration of a control entry and a bucket may vary. For example, the size of a bucket or a line in a bucket may be configured based on the size (e.g., average size) of an InfiniBand packet payload. In addition, the size and configuration of memory 204 may differ, depending on whether it is implemented on the same chip or component as other elements, or is implemented as an external memory. For example, an external memory of 4 MB may be used, with bucket sizes of 2 KB.

In FIG. 2, QP2 head 212a is the head pointer for a first queue pair, and therefore identifies the first control entry for QP2—e.g., entry i. QP2 head 212a also identifies the first memory bucket for QP2—bucket i. A value stored in control entry i (i.e., the value 1023) identifies the next control entry for the linked list and the next bucket—number 1023. Similarly, control entry 1023 identifies the next control entry and corresponding bucket (i.e., m). In the implementation of FIG. 2, control entry 0 is a null pointer. This entry may therefore be used to terminate a linked list.

QP2 tail 212b also identifies control entry m and bucket m, thus indicating where the next set of data (e.g., the payload of the next InfiniBand packet for QP2) should be stored. Information concerning how full a bucket is may be stored in queue pair pointers 210 or some other location.

For example, this information may be stored in the first line of the first bucket allocated to each outbound communication stored in the linked list. Additional information (e.g., queue pair number, virtual lane identifier, outbound port/queue identifier) may be stored before, after or as part of a communication reassembled in memory 204. Such information may be used to help process or transmit the communication correctly.

Illustratively, InfiniBand payloads are stored contiguously, within and across buckets, from the beginning to the end of one outbound communication (e.g., one encapsulated Ethernet packet). When the end of one communication is reached, a new bucket (and new control memory entry) may be started for that queue pair's linked list. In an alternative embodiment of the invention, portions of multiple different outbound communications may be stored in a single memory bucket.

A given control entry may be considered to be associated with, or correspond to, the memory bucket at the same position in a queue pair's linked list. Thus, in FIG. 2, control entry i is associated with memory bucket i, control entry m corresponds to memory bucket m, and so on.

In an embodiment of the invention, linked lists of outbound communications (e.g., communications that have been reassembled), anchored by head and tail pointers in transmit pointers 220 (e.g., PortA head pointer 222a and PortA tail pointer 222b), are maintained in the same way. Thus, each of control 202 and memory 204 are multi-ported structures in FIG. 2.

Free head 230a and free tail 230b are pointers used to maintain a linked list of free control entries and buckets. Thus, free head 230a identifies a first free control entry and a corresponding first free bucket in a free list, while free tail 230b identifies the last control entry and the last free bucket in the list. Free control entries and buckets may be removed from the head (or first) end and returned to the tail (or last) end of the free list. Similarly, buckets may be removed from a queue pair's linked list of buckets at the head end and returned at the tail end.

Figure 3:
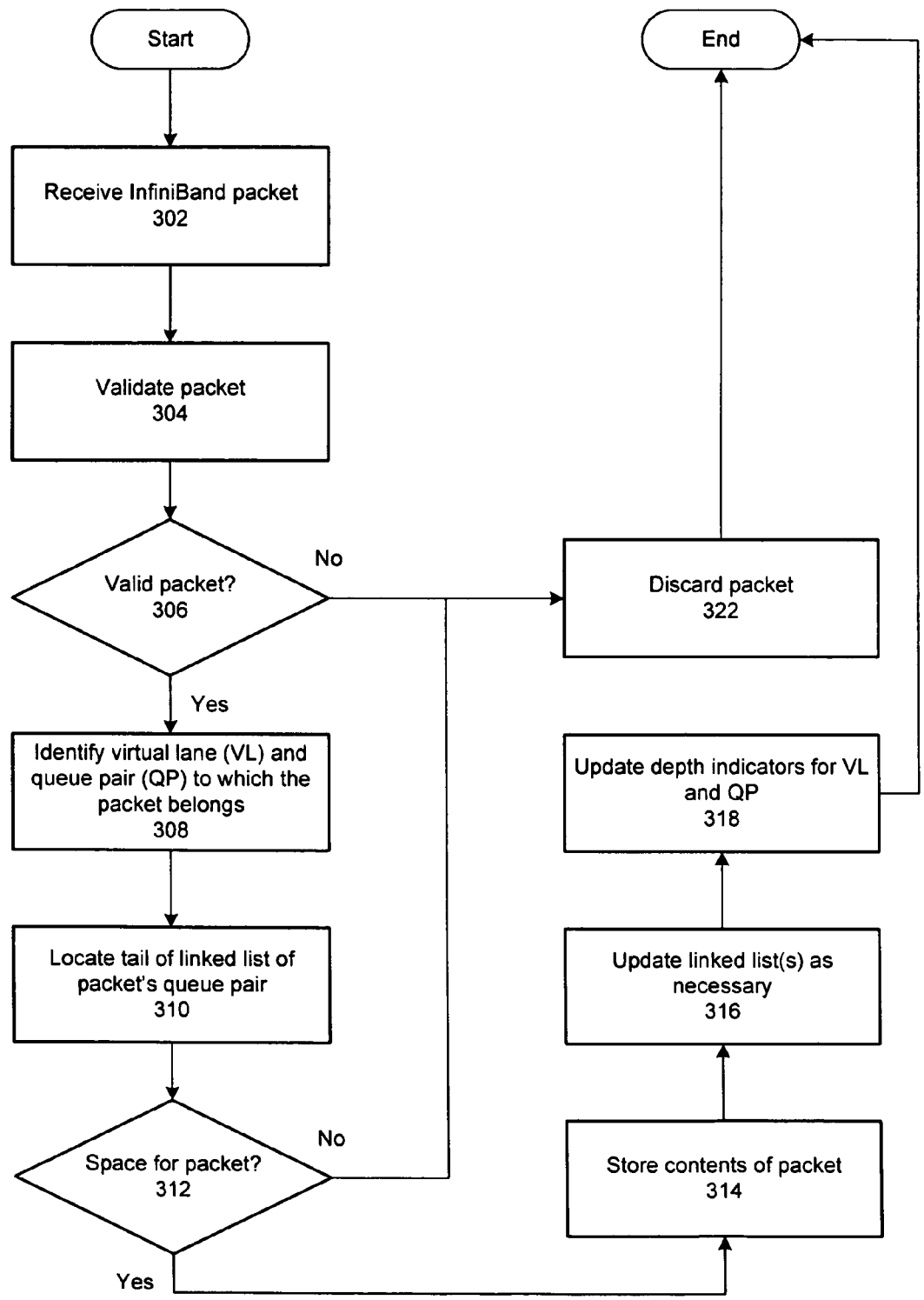
FIG. 3 is a flowchart illustrating one method of storing InfiniBand traffic from multiple queue pairs and virtual lanes in a shared memory, in accordance with an embodiment of the present invention.

FIG. 3 demonstrates a method of sharing a single memory structure to store InfiniBand traffic from multiple queue pairs and virtual lanes, according to one embodiment of the invention.

In operation 302, an InfiniBand packet is received at a channel adapter of a device coupled to an InfiniBand fabric and an external communication system (e.g., an Ethernet network). In this embodiment, the packet contains all or a portion of an encapsulated Ethernet packet.

In operation 304, InfiniBand packet validation rules are applied to determine whether the packet is valid.

In operation 306, if the packet is a valid InfiniBand packet the method continues to operation 308; otherwise, the method advances to operation 322.

In operation 308, the virtual lane and queue pair on which the InfiniBand packet was received are identified. Illustratively, the service level or virtual lane associated with the packet may affect the QoS afforded the Ethernet packet when it is transmitted on an outbound port.

In operation 310, the tail of the linked list for the packet's queue pair is located. In this embodiment, a pointer to the tail is maintained as part of a per-queue pair collection of data. The tail identifies the bucket in the shared memory in which the last packet payload was stored and the corresponding entry in a shared control structure that facilitates management of the linked list.

In operation 312, it is determined whether there is space in the shared memory structure for storing contents of the packet. If so, the illustrated method continues with operation 314; otherwise, the method advances to operation 322. A method of monitoring the amount of space in the memory for storing packets from different queue pairs is described in a following section.

In operation 314, the payload of the InfiniBand packet is stored in the memory structure. In this embodiment, entries in the shared control structure for the shared memory structure contain information regarding the status of the bucket that corresponds to the entry. Thus, it can readily be determined where in the bucket the payload should be stored and whether the entire payload will fit in the bucket. Illustratively, if the payload comprises the first fragment or portion of an outbound communication, or a set of RDMA Read descriptors for retrieving a communication, a new bucket may be used. Otherwise, the payload is stored contiguously with the previous payload for the communication.

In operation 316, the queue pair's linked list and possibly other lists or information are updated as necessary. For example, if a new memory bucket is needed to accommodate the payload, a bucket may be taken from a list of free (available or empty) memory buckets. The bucket and a new corresponding entry in the control structure are initialized as necessary and added to the QP's linked list.

In operation 318, depth indicators (e.g., pointers, counters) for the packet's queue pair and/or virtual lane may be updated as necessary to indicate how much traffic is currently stored in the shared memory for the queue pair and/or virtual lane. Queue Pair and/or virtual lane credits may be issued if warranted. The illustrated method then ends.

In operation 322, the received packet is either invalid (e.g., contains an unrecoverable error) or there is no space to store the packet payload in the shared memory. In this embodiment of the invention, the packet is therefore discarded. In other embodiments, other action may be taken.

Receive Flow Control with Combined Buffering of Virtual Lanes and Queue Pairs

In one embodiment of the invention, a system and method are provided for facilitating flow control of InfiniBand receive traffic, at the link layer and/or transport layer, when traffic received via virtual lanes and queue pairs are buffered in a single memory structure. An implementation of this embodiment is suitable for use with shared buffering as described in the preceding section, and the channel adapter described in conjunction with FIGS. 1 and 2.

In this embodiment, to properly apply flow control to queue pairs and/or virtual lanes, the amount of traffic stored in the shared memory for each active queue pair and/or virtual lane is tracked. As described above, linked lists may be maintained for each queue pair, thereby facilitating each queue pair's usage of the shared memory. And, by noting each queue pair's virtual lane membership, the total memory usage of all queue pairs within a particular virtual lane can be easily calculated.

In an embodiment of the invention, a dedicated portion of the shared memory structure may be allocated to a given queue pair or virtual lane. And, queue pairs and virtual lanes allocated a dedicated portion of the memory may or may not be permitted to also use a shared portion of the memory that can be drawn upon by multiple queue pairs and/or virtual lanes. Queue pairs and virtual lanes not allocated dedicated memory space use only shared memory for queuing their traffic. Thus, applying flow control for an individual queue pair or virtual lane will consider the amount of space available to it, including dedicated and/or shared space.

In this embodiment, an InfiniBand Resource Manager (IRM) module, which may be part of an InfiniBand Receive Module (IRX), manages the shared memory. In particular, the IRM allocates or grants memory buckets (i.e., units of memory), receives buckets (e.g., after they are used), and performs other actions to facilitate usage of the shared memory structure. In particular, it tracks the amount of traffic in the shared memory for a channel adapter's queue pairs and virtual lanes. It also implements or facilitates various flow control mechanisms, such as link layer (virtual lane) credits, transport layer (queue pair) credits, retries and RDMA Read operations. It also maintains various operating parameters regarding the queue pairs and virtual lanes.

Figure 4:
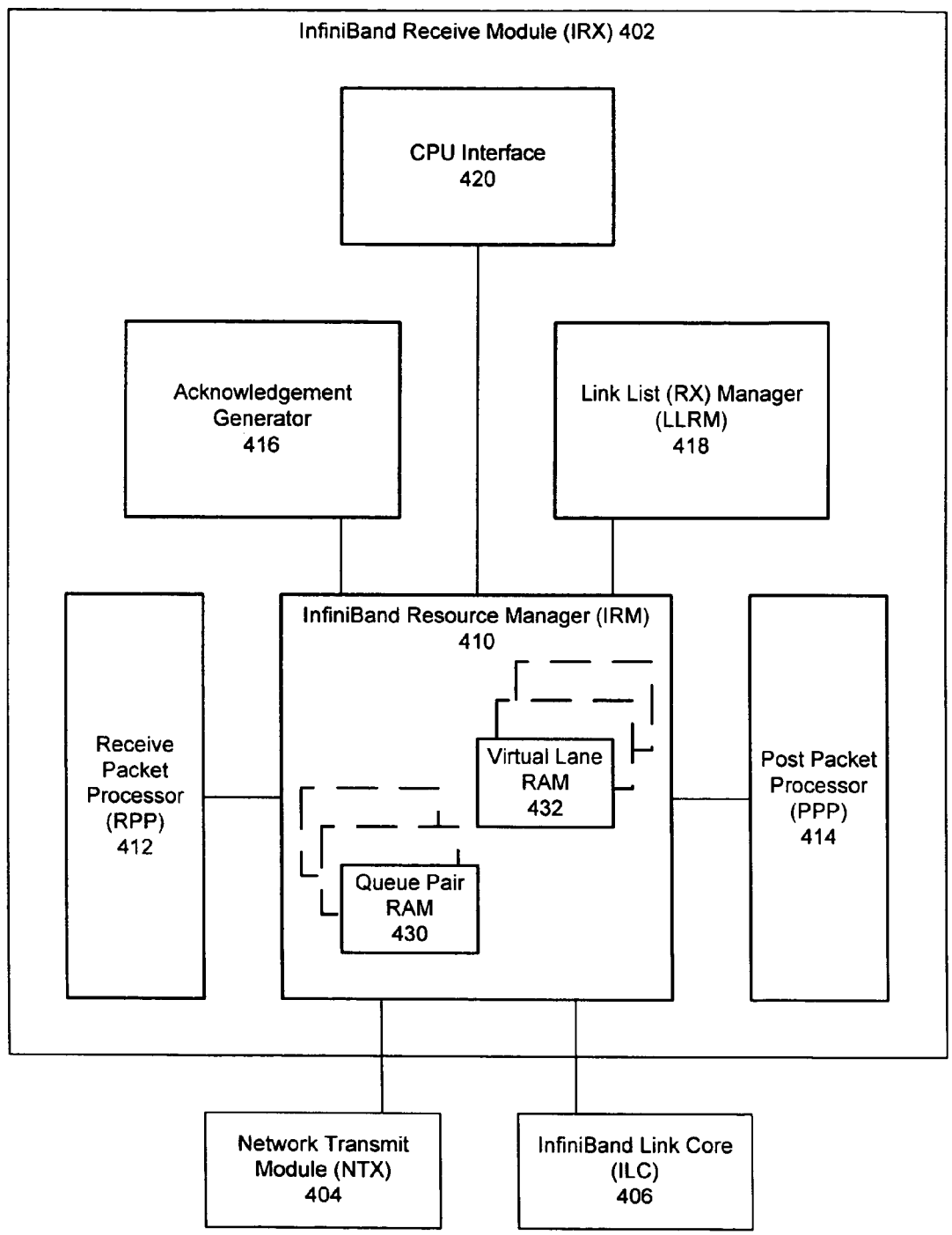
FIG. 4 is a block diagram of an InfiniBand receive module, according to one embodiment of the invention.

FIG. 4 is a block diagram of an InfiniBand Receive Module (IRX), according to one embodiment of the invention. The IRX is part of a channel adapter or other device used to interface a computing or communication device to an InfiniBand fabric, and contains a shared memory structure providing common buffering for multiple queue pairs and/or virtual lanes.

In FIG. 4, IRX 402 includes InfiniBand Resource Module (IRM) 410, Receive Packet Processor (RPP) 412, Post Packet Processor (PPP) 414, acknowledgement generator 416, Link List (Receive) Manager (LLRM) 418 and CPU interface 420, in addition to a collection of queue pair pointers (not shown in FIG. 4).

IRM 410 includes queue pair memory (or memories) 430 and virtual lane memory (or memories) 432, and interfaces with Network Transmit Module (NTX) 404 and InfiniBand Link Core (ILC) 406. Not shown in FIG. 4 are the shared memory and shared control structures (e.g., memory 114 and control 112 of FIG. 1) in which queue pairs' queues (i.e., linked lists) are maintained.

In one embodiment of the invention, IRM 410 supports four virtual lanes for each receive port of the channel adapter on which the IRM resides, in addition to always-present virtual lane 15 (which is dedicated to management traffic). The channel adapter may operate in a single-port or dual-port mode.

In this embodiment, up to 64 user-assignable active queue pairs may be supported by IRM 410, with queue pairs zero and one being reserved for management traffic. In other embodiments, other quantities of virtual lanes and queue pairs may be supported by an InfiniBand Resource Module (e.g., up to $2^{24}$).

In FIG. 4, RPP 412 requests and receives resources (e.g., memory buckets, entries in the control structure) from IRM 410 for new packets received at the channel adapter. For example, RPP 412 may notify IRM 410 of a need to store a payload of a new packet, and may indicate the amount of space needed. IRM 410 may then allocate or reserve a sufficient number of memory buckets for the payload. The RPP also facilitates the storage of data received via RDMA Read operations, by queuing RDMA Read descriptors for example. RPP 412 may return unused buckets to the IRM if, for example, the packet is dropped or rejected (e.g., because of an error). RPP 412 may also recognize the late detection of an error in a packet and return allocated resources if the packet must be rejected.

PPP 414 evaluates the size of an RDMA Read descriptor queued by the RPP, and signals IRM 410 to reserve the necessary resources. The resources are reserved for that RDMA Read and, when the operation occurs, the RPP recognizes the operation and matches the reserved resources with the operation. Thus, an RNR-NAK should never need to be issued for an RDMA Read operation.

Acknowledgement generator 416 generates fields of an InfiniBand ACK (acknowledgment) or NAK (negative acknowledgement) packet, and constructs and forwards ACK packets of transport layer flow control information to an InfiniBand Transmit (ITX) module (e.g., to advertise message credits, issue an RNR-NAK). For example, the acknowledgement generator may query IRM 410 to determine how much storage space is available for a particular queue pair, and report a corresponding number of available queue pair credits to the ITX.

LLRM 418 maintains linked lists of used and unused memory buckets and control entries. Illustratively, IRM 410 passes returned buckets to LLRM 418 for addition to the free list. As shown in FIG. 2, a head and tail pointer may be maintained for managing the linked list of free buffers.

CPU interface 420 facilitates the configuration of various register and/or memory settings in IRM 410 and/or other modules. Via the CPU interface, IRM 410 is notified of new queue pairs and/or virtual lanes to be established. Illustratively, the IRM is informed of the amount of space needed for the new queue pair or virtual lane (e.g., an initial allocation of buckets) and will reserve that space if it is available, or will assemble or aggregate the necessary space as it becomes available (e.g., as used buckets are returned).

As described in a previous section, NTX 404 transmits outbound communications after they have been reassembled in the shared memory. The NTX notifies IRM 410 when the buckets used by a transmitted communication can be reclaimed.

ILC 406 handles link layer flow control for IRX 402. IRM 410 notifies the ILC of the space available for virtual lanes, and the ILC can then issue an appropriate number of link layer credits on each virtual lane.

More particularly, link level flow control in an embodiment of the invention depends on the allocation of buffers to each virtual lane (for use by the queue pairs that belong to each virtual lane), and the issuance and redemption of credits for traffic traversing the virtual lane. Dynamic programmable threshold registers may be maintained in IRM 410 (i.e., memories 430, 432) or elsewhere, to store the amount of buffer space currently available for each queue pair and/or virtual lane, and or other information.

More specifically, in one embodiment of the invention, queue pair memory (or memories) 430 stores various parameters for managing operation of queue pairs. For example, and as discussed below, dynamic programmable thresholds may be maintained to indicate the amount of buffer space used by (or available to) a queue pair, programmable amounts of credits a queue pair may advertise depending on which of the thresholds have been reached, whether a queue pair is able to used shared memory buffers, a maximum (if any) amount of dedicated buffer space allocated to a queue pair, etc.

Similarly, virtual lane memory (or memories) 432 store operating parameters for virtual lanes, as described below. For example, memory 432 may store the amount of buffer space allocated to each virtual lane.

Figure 5:
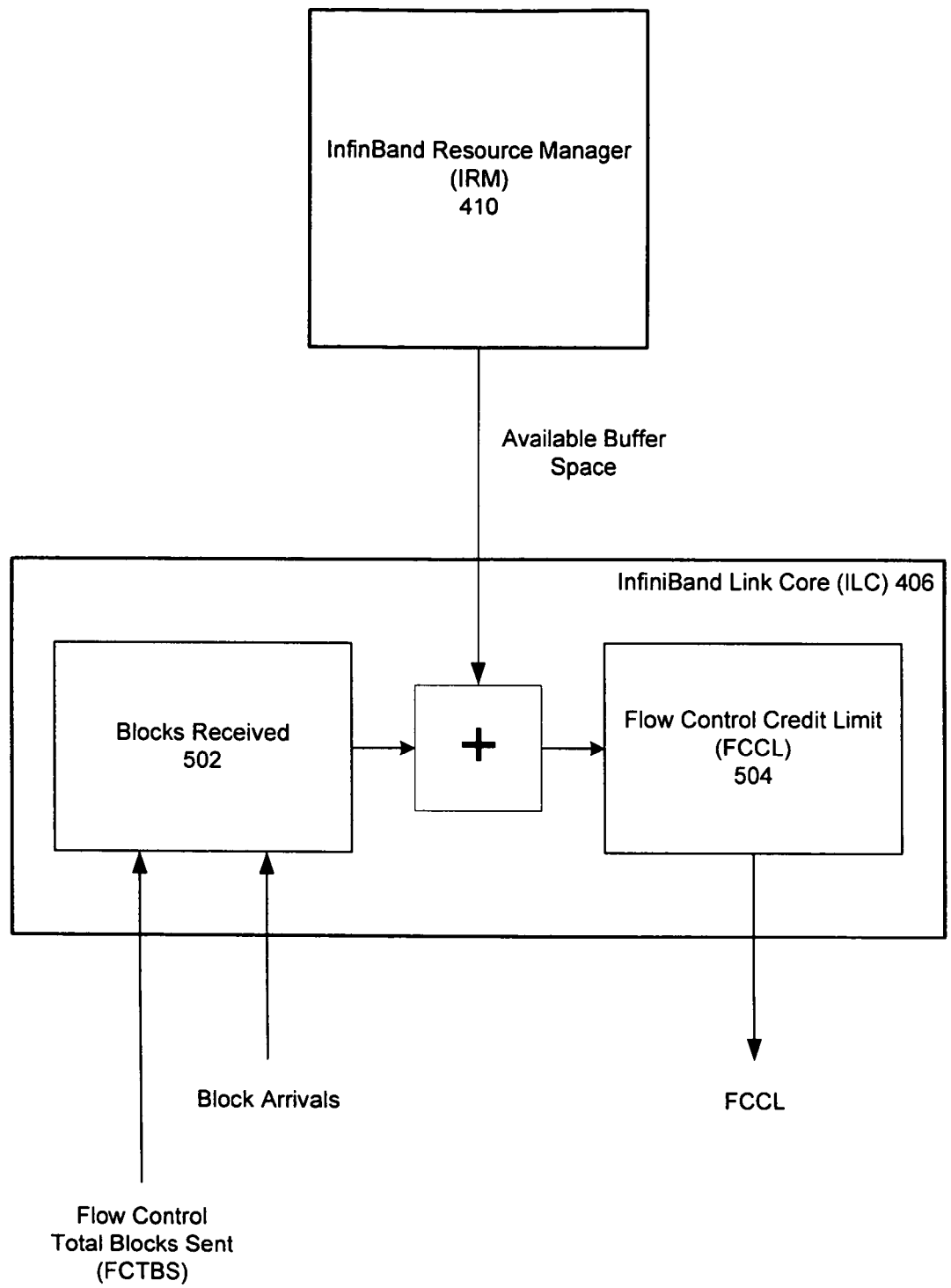
FIG. 5 is a block diagram of a flow control portion of an InfiniBand link core, showing its interaction with a Resource Manager, according to one embodiment of the invention.

FIG. 5 demonstrates an apparatus for calculating link level flow control credits, according to one embodiment of the invention. This embodiment is suitable for implementation with the InfiniBand Resource Manager depicted in FIG. 4. Up to sixteen virtual lanes may be implemented in the illustrated embodiment of the invention.

In FIG. 5, InfiniBand Link Core (ILC) 406 receives, on a per-virtual lane basis, the amount of available buffer space (e.g., in buckets). A virtual lane's available buffer space may be signaled every time it changes, or with some other regularity. Illustratively, the buffer space available for a virtual lane (or queue pair) may change whenever a new packet or payload is stored (thereby taking up some of the available space) and whenever an outbound communication is transmitted (thereby freeing up space in the shared memory).

The FCTBS (Flow Control Total Blocks Sent) value arrives periodically from a link partner, and is noted or stored as "blocks received" 502. After a FCTBS value is loaded, blocks received 502 increments in response to the arrival of blocks from that link partner. A separate "blocks received" value or register may be maintained for each virtual lane.

For each virtual lane, ILC 406 adds blocks received 502 and the buffer space available for the virtual lane (e.g., measured in blocks), to calculate FCCL (Flow Control Credit Limit) 504. FCCL 504 represents the maximum amount of traffic (in credits, one credit per block) the link partner on a particular virtual lane may send on that virtual lane. FCCL 504 is periodically transmitted to the link partner.

The link partner, when it wants to send data, determines whether it has any credits available. For example it may subtract the total blocks sent on the link from FCCL. It cannot send the data if the difference is less than or equal to zero.

Because the buffer space that is available for a given virtual lane is continuously updated, and the blocks received on the virtual lane are also continuously updated, FCCL 504 represents the additional amount of traffic that can be accepted for the virtual lane.

In this embodiment of the invention, for each virtual lane, several values are maintained (e.g., in virtual lane memory 432 of FIG. 4), such as: VL_enabled, which indicates whether the virtual lane is enabled (e.g., active); VL_threshold, which identifies the maximum amount of buffer space (e.g., in buckets) that the virtual lane may use; and VL_queued, which identifies the current amount of buffer space (e.g., in buckets) that the virtual lane is using. These values are initialized when the virtual lane is established or reset.

As contents of InfiniBand data packets are stored in the shared memory, VL_queued is incremented and compared to VL_threshold. If VL_threshold is exceeded, the available buffer space for that virtual lane that is reported to ILC 406 by IRM 410 is zero. Otherwise, the difference between VL_queued and VL_threshold is reported.

In one alternative embodiment of the invention, the amount of buffer space available for a virtual lane may be calculated by aggregating the buffer space available for each queue pair within the virtual lane. A method of determining the amount of buffer space available to a queue pair (shared space and/or dedicated space) is described below.

In one embodiment of the invention, the total available buffer space (e.g., in the entire shared memory structure) is divided between virtual lanes based on such factors as the quality of service associated with a virtual lane, arbitration priorities of the virtual lanes, the number of queue pairs belonging to a virtual lane, etc. Not all of the storage space of the shared memory structure need be allocated to active virtual lanes. Some may be reserved to allow a virtual lane to temporarily exceed its allocation, to facilitate the establishment of a new virtual lane or queue pair, or for some other reason.

Further, the amount of space allotted to a virtual lane is programmable, and over-subscription of buffer space may be permitted. The amount of buffer space allocated to a management virtual lane (e.g., virtual lane fifteen) may be minimal, such as 384 bytes—enough to store one 256-byte payload plus an InfiniBand header, as required by the InfiniBand specification—or more.

In an embodiment of the invention in which the shared memory structure is an internal memory 128 KB in size, with each bucket being 128 bytes (see FIG. 2), illustrative virtual lane parameter values are as follows. If only two virtual lanes are active—e.g., virtual lanes zero and fifteen—VL_enabled will be true (i.e., 1) for those two virtual lanes and false (i.e., 0) for all others. For the two active virtual lanes, VL_queued is initially set to zero. Illustrative VL_threshold values are 1,016 (0x3F0) buckets for virtual lane zero and four buckets for virtual lane fifteen. VL_queued and VL_threshold are meaningless for inactive virtual lanes.

As another example, if four virtual lanes are active for data (e.g., virtual lanes zero through three), in addition to virtual lane fifteen, illustrative parameters are as follows. VL_enabled is true for the active virtual lanes, and false for all others. VL_queued is zero for virtual lane fifteen and zero for the other active virtual lanes. VL_threshold is four buckets for virtual lane fifteen and 252 (0x0FC) buckets for the other active virtual lanes.

In an embodiment of the invention, besides the use of link credits for flow controlling at the link layer, one or more end-to-end flow control mechanisms may be implemented at the transport layer. Illustrative end-to-end flow control mechanisms that may be applied include queue pair credits and RNR-NAK (Retry, Not Ready, Negative AcKnowledgement), both of which may be issued on a per-queue pair basis. Allocation of space for RDMA Read responses prior to request may be considered another end-to-end flow control mechanism.

End-to-end credits are issued for each InfiniBand message that the receiver is willing to accept. However, the InfiniBand standard defines a message as being of any length between $2^0$ and $2^{32}$ bytes. Therefore, to promote efficient and fair use of the shared memory, the number of dedicated and/or shared memory buckets a queue pair may consume are programmable. Illustratively, as the amount of buffer space (e.g., memory buckets) a queue pair consumes increases past programmable thresholds, the number of end-to-end credits it may advertise is determined by corresponding programmable values. The programmable threshold values and credits may be stored, per-queue pair, in the InfiniBand Resource Manager module (e.g., in queue pair memories 430 of FIG. 4).

Thus, embodiments of the invention provide programmability to allow compromises between disparate goals of good link bandwidth utilization, low retry rate, good buffer utilization, RDMA versus Send modes for data transferred on a queue pair, etc.

Figure 6:
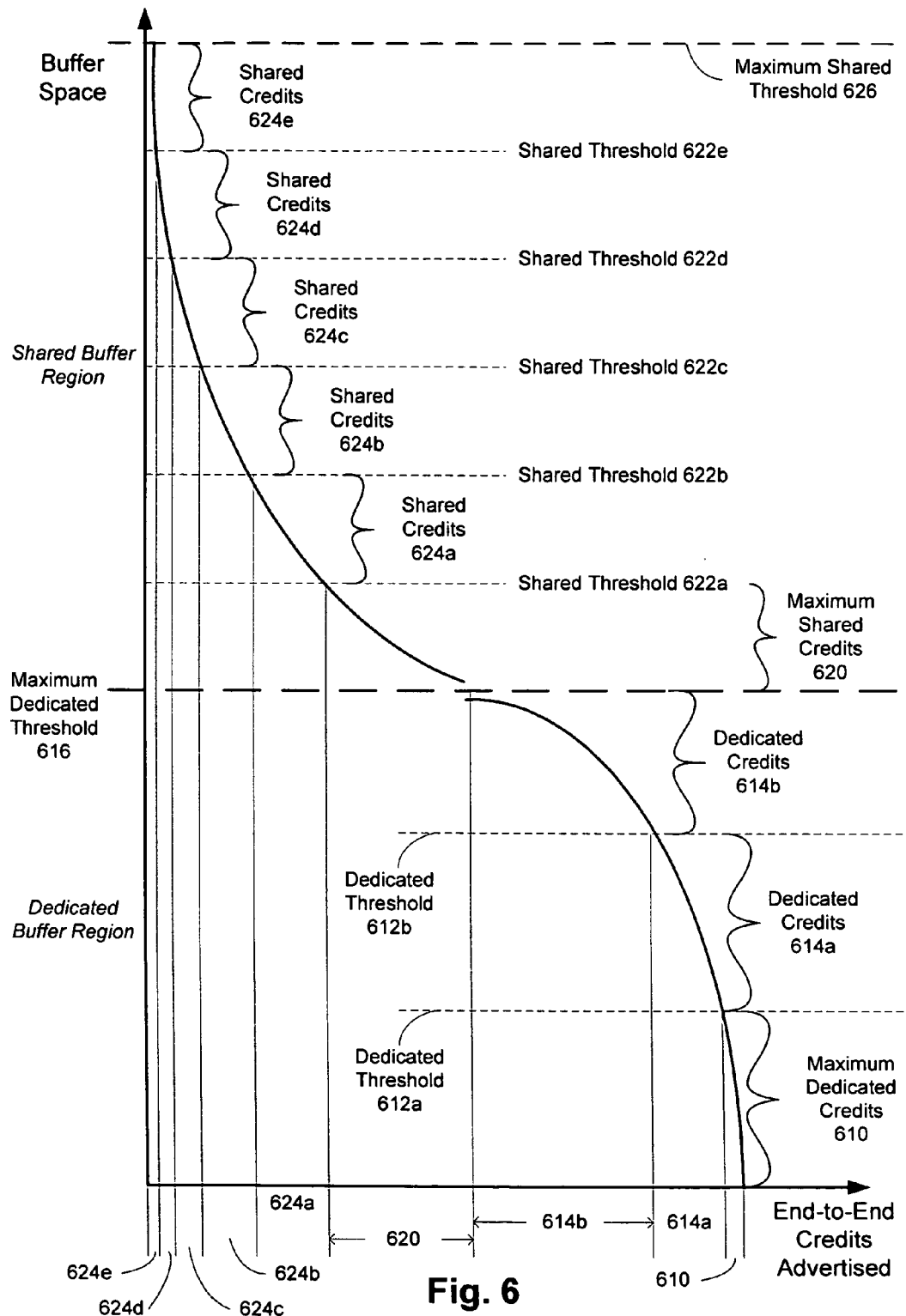
FIG. 6 is a graph demonstrating one method of setting thresholds and corresponding amounts of advertisable message credits, according to one embodiment of the invention.

FIG. 6 is a graph demonstrating how programmable thresholds and associated queue pair credit values may be arranged, according to one embodiment of the invention. In the graph of FIG. 6, the x-axis represents InfiniBand end-to-end credits (also termed message credits or queue pair credits) that a node may advertise for a queue pair. The y-axis represents buffer space, which may be measured in buckets.

The graph is divided into two portions, with the lower portion addressing the allocation of dedicated buffer space and the upper portion covering the allocation of shared buffer space. Maximum dedicated threshold 616 separates the two portions, and represents the maximum amount of buffer space dedicated to a particular queue pair. A queue pair may not be authorized or enabled to use shared buffer space and, if not authorized, would therefore not have an upper portion of the graph.

Maximum dedicated threshold 616 may be any value between zero and the size of the shared memory structure, inclusive. Any queue pair having a maximum dedicated threshold of zero uses only shared buffer space, and therefore has no lower portion of the graph and may always contend for buffer space with other queue pairs.

Below maximum dedicated threshold 616, a queue pair is initially able to advertise an amount of credits equal to maximum dedicated credits 610 (e.g., after being established or reinitialized). Once the amount of dedicated buffer space used by the queue pair reaches a first threshold (e.g., dedicated threshold 612a), the number of credits it can advertise decreases (e.g., to dedicated credits 614a). Any number of similar thresholds (e.g., threshold 612b) and credits (e.g., dedicated credits 614b) may be set between zero and maximum dedicated threshold 616.

When the amount of dedicated buffer space used by the queue pair reaches maximum dedicated threshold 616, the queue pair can no longer advertise credits unless it is enabled to use shared buffer space, in which case it advertises credits according to the upper portion of the graph in FIG. 6. Otherwise, it must send RNR-NAK packets directing senders to try sending their data later.

The upper portion of the graph is also marked by a series of thresholds and corresponding amounts of buffer space (e.g., credits). When first allowed access to shared buffer space, a queue pair may advertise an amount of space indicated by maximum shared credits 620. Thereafter, as the amount of used shared buffer space increases past programmed thresholds (e.g., shared thresholds 622a-622e), the amount of buffer space or credits the queue pair can advertise decreases accordingly (e.g., shared credits 624a-624e). In another embodiment of the invention, each queue pair has a "weighting" factor used to modify the advertised shared credit values.

The shared threshold values indicated in FIG. 6 measure the total buffer space consumed by all queue pairs authorized or programmed to use shared buffer space. When maximum shared threshold 626 is reached, all queue pairs can no longer advertise credits, and must send RNR-NAKs. In one embodiment of the invention, back-off periods specified in a queue pair's RNR-NAK packets may be incremented, in successive packets, until a retry after a particular back-off period succeeds. Upon successful back-off, the back-off period for an individual queue pair may be reset to a default value. The back-off increments may increase linearly, exponentially or in some other fashion.

Note that the amount of credits a queue pair may advertise may increase when the queue pair exhausts its dedicated buffer space and starts using shared buffer space. That is, maximum shared credits 620 may be greater than a final dedicated credits value (e.g., dedicated shared credits 614b).

The number of message credits a queue pair may advertise may be reported to the other end of the queue pair by an acknowledgement generator (e.g., acknowledgement generator 416 of FIG. 4).

Each queue pair's thresholds and credit limits may differ; therefore, each queue pair's dedicated region (i.e., lower portion) of the graph may be different. However, in a present embodiment of the invention, each queue pair enabled to use the shared buffer space applies the same thresholds and credit limits in the shared region (i.e., upper portion).

Various criteria may be considered when selecting and programming appropriate thresholds and credits for a queue pair. And, the memory structure used for buffering queue pair and/or virtual lanes may be under- or over-subscribed. Illustratively, any number of threshold/credit value pairs may be programmed between the extremes of;

(Memorysize_Max_Packet_Size)–Max_Packet_Size and:

(Memoryjsize_(Max_Packet_Size*Num_QPs))–Max_Packet_Size where Memory_size is the size of the shared memory structure (e.g., in buckets), Max_Packet_Size is the maximum expected packet size (e.g., in buckets) and Num_QPs is the number of active queue pairs.

Specific threshold/credit values may depend upon factors such as the type of traffic being received (e.g., encapsulated Ethernet packets), the amount of buffer space dedicated to a queue pair, the amount of shared buffer space, etc. A queue pair's threshold/credit values for its dedicated region of the graph may be stored in a queue pair-specific memory (e.g., in the IRM module). The shared threshold/credit values for the shared region may be stored in a globally accessible register or structure.

In one embodiment of the invention, the maximum dedicated credits value for all queue pairs that are active and not dedicated to management traffic may be set to the maximum amount of buffer space—e.g., 1,024 buckets in the shared memory structure of FIG. 2. A first dedicated threshold may be set at one bucket, to decrease the number of advertisable credits to 768. A second dedicated threshold may be set at two buckets, to decrease the number of advertisable credits to 512. The active, non-management queue pairs' maximum dedicated thresholds may be set to three buckets, and all may be enabled to use shared buffers.

In this embodiment, the maximum shared credits value may be 1,023, while the maximum shared threshold value may be 831, to leave shared buffer space for completing the reassembly of outbound communications, facilitating establishment of a new queue pair or virtual lane, or for some other purpose. Illustrative shared threshold/advertisable credit tuples may be as follows: <64, 192>, <128, 96>, <256, 48>, <576, 24>, <704, 3> and <768, 1>.

In the embodiment of the invention illustrated in FIG. 6, RNR-NAK is a primary method of flow controlling queue pairs. An RNR-NAK will be sent if a queue pair's dedicated buffer space is full and it is not permitted to use shared buffers, or if the queue pair's dedicated buffer space is full, and it is permitted to use shared buffers, but the shared buffer space is full.

To facilitate an RDMA Read operation, resources may be reserved for the operation before the RDMA Read is issued. But first the IRM must determine whether the corresponding queue pair has sufficient space. Illustratively, the queue pair's depth is calculated as the number of buckets currently in use (i.e., to store payloads of received InfiniBand packets) plus the number of buckets currently reserved for outstanding RDMA Reads. A new RDMA Read will only be issued if this sum and the queue pair's programmable thresholds indicate that buffer space is available. Space for the RDMA Read will then be allocated from the dedicated and/or shared buffer space.

In addition to the programmable threshold and credit values, the number of outstanding RDMA Read operations a queue pair may have may also be programmable, and may be maintained in the IRM or some other module. Other parameters the IRM may store for a queue pair include the queue pair's current depth, whether the last packet received for the queue pair resulted in an RNR-NAK, whether increasing back-off is enabled for RNR-NAK, etc.

In one embodiment of the invention, there is a maximum number of outbound communications that may be reassembled in the shared memory structure at one time. When this maximum number is reached, no new queue pairs (or virtual lanes, in one implementation) may be established until the number of communications being reassembled falls below the maximum. Thus, in this embodiment, a programmable amount of buffer space is reserved for completing the reassembly of communications, and the maximum shared threshold value (e.g., threshold 626 in FIG. 6) will be less than the total amount of shared buffer space in the memory structure.

Illustratively, when used buffer space (e.g., one or more memory buckets) is returned, the returned space is first added to the amount of shared space that is available. Then, when the shared space has been fully restored, or restored past a specified threshold (e.g., dedicated threshold 616), space may be returned to individual queue pairs' dedicated regions. The manner in which returned buckets are added to shared or dedicated buffer space may differ in other embodiments of the invention.

Figure 7:
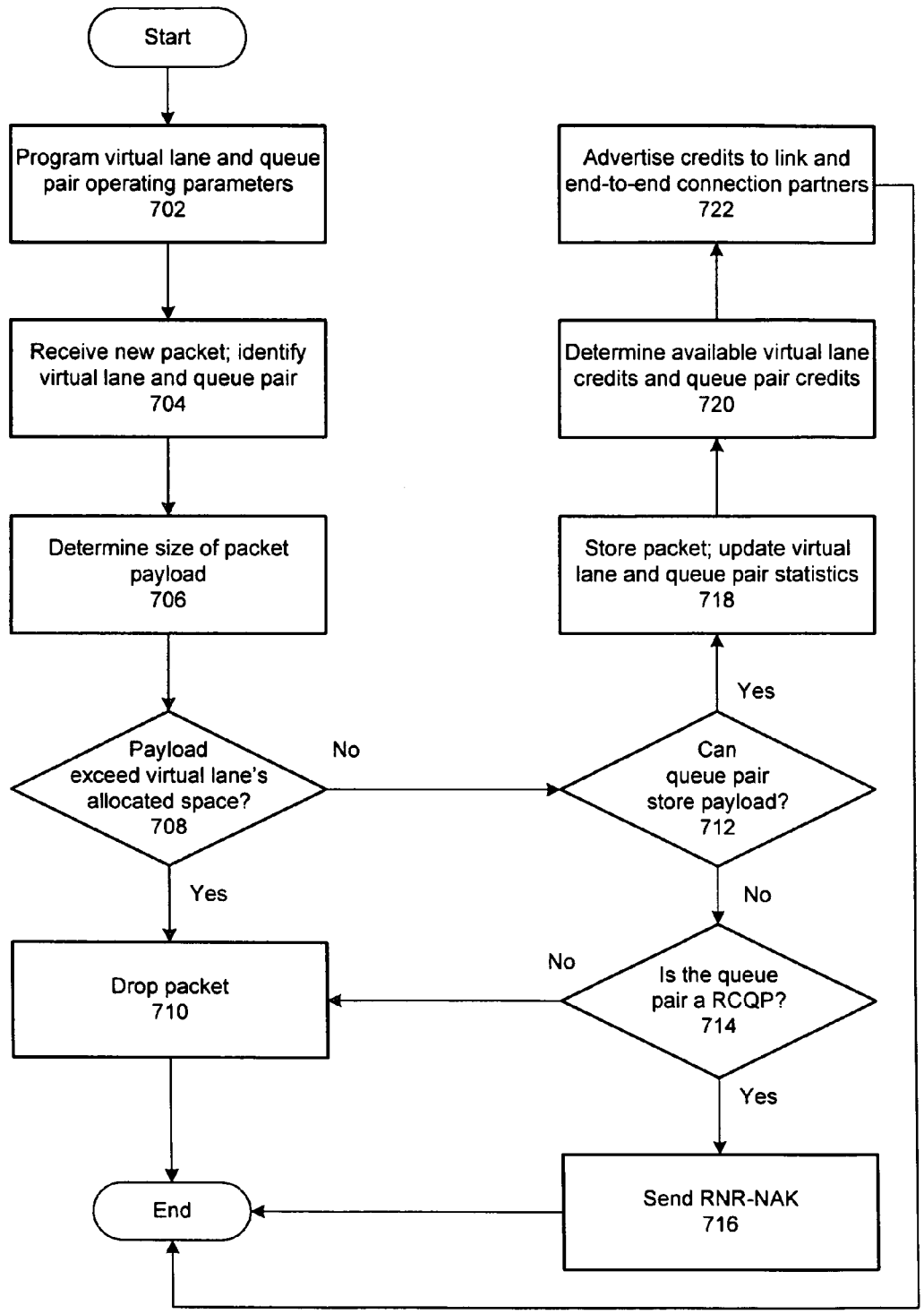
FIG. 7 is a flowchart illustrating one method of applying flow control to InfiniBand traffic received from multiple queue pairs and virtual lanes and stored in a shared memory structure, in accordance with an embodiment of the present invention.

FIG. 7 demonstrates a method of performing link layer and transport layer flow control for InfiniBand traffic received at a channel adapter, according to one embodiment of the invention. The various virtual lanes and queue pairs share a single memory structure comprising multiple buckets or buffers that can be dedicated to a virtual lane or queue pair, or that can be part of a pool of shared buckets.

In operation 702, various operating parameters are set that pertain to the virtual lanes and queue pairs terminating at the adapter. For a virtual lane, the parameters may include the amount of buffer space currently used, the maximum amount that may be used (e.g., the number of buffers dedicated to the virtual lane), and whether the virtual lane is active.

For a queue pair, the parameters may include indications of whether the queue pair is active and whether it can use the pool of shared buckets. Other possible queue pair parameters include the various dedicated and shared thresholds and matching credit values, the maximum number of credits that may be advertised when using dedicated and/or shared buckets, an RNR-NAK timer and back-off enable value, a measure of the current amount of memory space (e.g., number of buckets) used by the queue pair, etc. The various parameters may be stored in an InfiniBand resource manager module.

In operation 704, a new packet is received, and its virtual lane and queue pair are identified (e.g., by the resource manager or a receive packet processor module). Some or all of the operating parameters associated with the virtual lane and/or queue pair may be retrieved.

In operation 706, the size of the packet payload is determined. In this embodiment, only the packet payload is to be stored in the shared memory structure. In other embodiments, other contents—such as the entire packet—may be stored, in which case the size of the whole packet is noted.

In operation 708, it is determined whether the virtual lane's threshold (e.g., maximum size) would be exceeded if the payload were stored. If not, the method advances to operation 712; otherwise, the method continues with operation 710.

In operation 710, the packet is dropped or rejected. The method then ends.

In operation 712, the queue pair is examined to determine if it can accept the payload. For example, the current size of the queue pair's queue (e.g., the number of buckets it uses) may be compared to its maximum number of dedicated buckets. Further, if the queue pair is permitted to draw from the pool of shared buckets, it may be determined whether any shared buckets are available. If the queue pair can store the payload, the illustrated method advances to operation 718.

In operation 714, it is determined whether the queue pair is a reliable connected queue pair (RCQP). Alternatively, the queue pair may be an unreliable datagram queue pair (UDQP). If the queue pair is an RCQP, the method continues with operation 716; otherwise, the method concludes with operation 710.

In operation 716, an RNR-NAK response is sent to the other end of the queue pair, to direct the sender to retry the packet later. The method then ends.

In operation 718, the packet payload is stored and the virtual lane and/or queue pair data are updated accordingly. For example, their queue sizes may be incremented, the linked list for the queue pair may be adjusted (e.g., if a new bucket was put into use), etc.

In operation 720, the number of link and transport layer credits remaining for the virtual lane and queue pair are calculated. A method of determining available link layer credits is described above in conjunction with FIG. 5. The number of message credits that can be advertised for the queue pair may be determined by identifying the lowest dedicated or shared threshold the queue pair's queue size has exceeded, and retrieving from storage the number of credits associated with that threshold.

In operation 722, the link layer and transport layer credits are advertised to the link partner and connection partner, respectively. The method then ends.

Mapping Communications to an External Port, with Combined Buffering of Virtual Lanes and Queue Pairs In an embodiment of the invention, a system and methods are provided for mapping communications between an InfiniBand queue pair (QP) and a communication system or component external to the InfiniBand fabric. For example, a fabric may be coupled to an external network or communication system (e.g., an Ethernet network) via a computing or communication device comprising an InfiniBand channel adapter, as shown in FIG. 1.

Within the device, communications destined for the external system (e.g., Ethernet packets) are received from the InfiniBand fabric via various queue pairs and virtual lanes, stored in a shared memory structure, and then transferred to the external system. FIG. 2 depicts one implementation of the shared memory structure.

In this embodiment, the shared memory structure is used to reassemble traffic as it is received from the fabric. The memory structure is shared among multiple queue pairs, each of which may have traversed any virtual lane (VL) to arrive at the computing device. As described above, the shared memory structure is managed as a set of linked lists, thereby allowing traffic from multiple queue pairs and virtual lanes to use the same structure simultaneously. When a complete communication is reassembled, the portion of the corresponding queue pair's linked list that encompasses the communication is transferred to a module configured to process the communication for transmission (e.g., NTX 130 of FIG. 1). This avoids the need to copy the communication between the inbound InfiniBand queue pair/virtual lane and the outbound port or connection.

In the embodiment of the invention illustrated in FIG. 2, when an outbound communication is fully reassembled in memory 204, pointers identifying the buckets in which the communication is stored are copied to transmit pointers 220 for the appropriate external port. Each external port may have one or more associated queues (e.g., for different qualities of service).

For example, if the reassembled communication was received on queue pair 2 and is intended for transmission on port A, the portion of queue pair 2's linked list encompassing the communication is moved to the linked list anchored by PortA head 222a and PortA tail 222b. Thus, transmit pointers 220 enable access to control 202 and memory 204 for the transmission of communications, and the control and memory serve not only as an input queue from the InfiniBand fabric, but also an output queue for external communications.

The sizes of the queue pair and external port linked lists are dynamic, allowing them to grow and shrink as InfiniBand traffic is received and as outbound communications are transmitted. The outbound communications may be received via InfiniBand Send commands, RDMA Read operations and/or other forms.

In an embodiment of the invention, a new outbound communication is received encapsulated within one or more InfiniBand packets. When reassembly of the new communication is initiated, the first memory bucket used for the new communication is also used to store various meta-information before storing the first portion of the communication. Illustratively, the meta-information may be stored in the first line of the first bucket, and may include information such as: the virtual lane and queue pair through which the communication is received, the external port through which it should be transmitted, a quality of service (QoS) to be afforded the communication, a checksum calculated on the communication, checksum offset, etc.

When control of the reassembled communication is passed to a network transmit module, the port and QoS information indicate where the pointers to the linked list describing the communication should be queued. The virtual lane and queue pair information may be used by the network transmit module, after the communication is transmitted, to return the used memory buckets (e.g., to the InfiniBand resource manager or receive module).

To properly manage the queue pairs and the issuance of queue pair (and/or virtual lane) credits, buckets in which an outbound communication is reassembled may not be released from a queue pair's linked list until the communication is transmitted and the external port releases the associated control entries and buckets. Then one or more parameters (e.g., depth counters) indicating the amount of the shared memory structure used by the queue pair (and/or virtual lane) are updated, which may allow the queue pair (and/or virtual lane) to advertise more credits.

The queue pairs through which communications are received for reassembly may be reliable connected queue pairs (RCQPs). Thus, each InfiniBand packet received in one of the RCQPs may have a packet sequence number, and ordered receipt of the fragments of an outbound communication can be ensured.

Some or all of the components illustrated in FIG. 2, as well as other elements of a channel adapter, may be embedded on a single ASIC (Application-Specific Integrated Circuit). Thus, the size of memory 204 and control 202 may be constrained. The use of linked lists for the queue pairs allows flexible and efficient use of buffering memory, without wasting space or denying memory buckets to a queue pair or virtual lane when needed.

Figure 8:
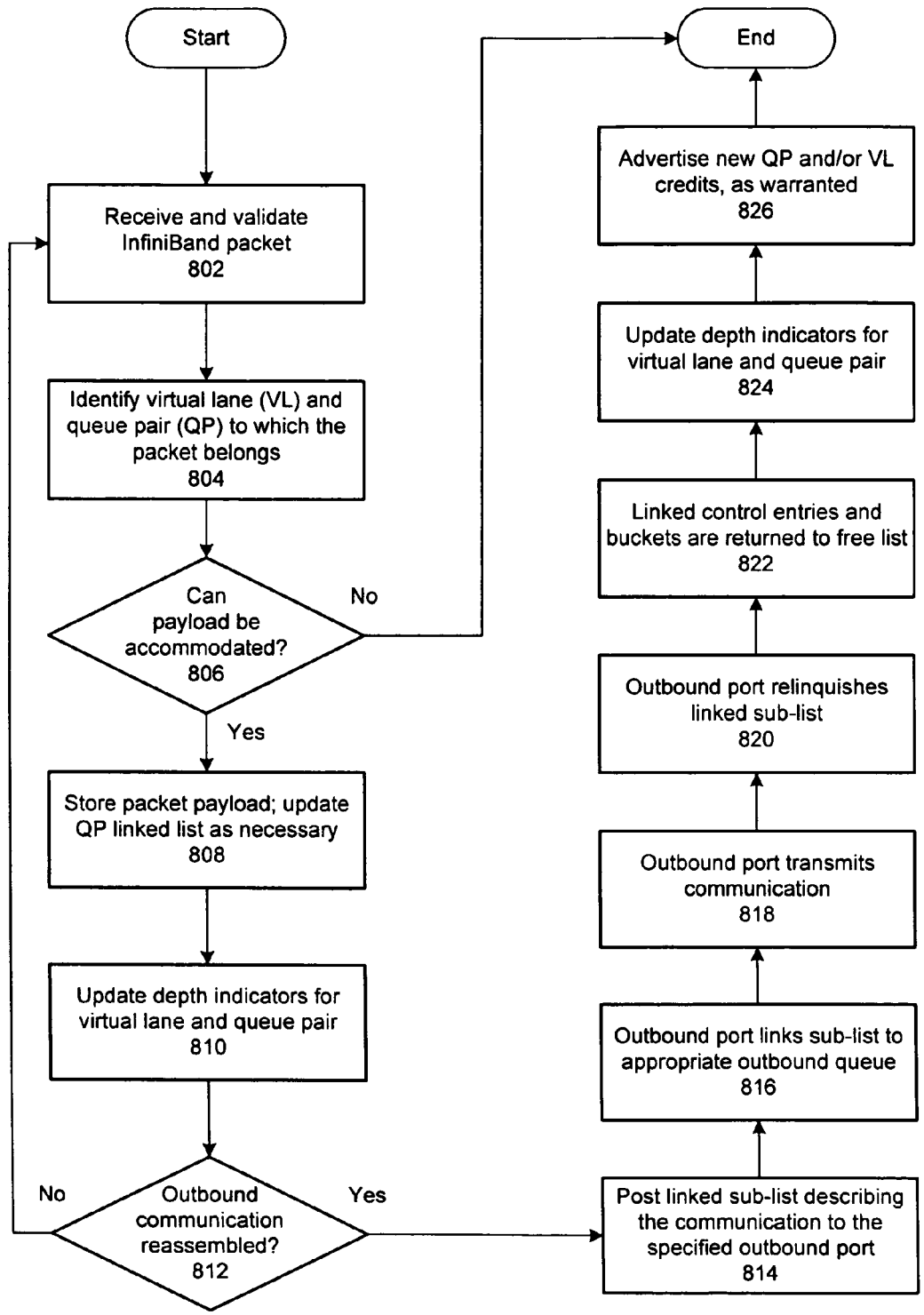
FIG. 8 is a flowchart illustrating one method of mapping InfiniBand communications to an external communication system, in accordance with an embodiment of the present invention.

FIG. 8 demonstrates a method of mapping communications between a memory structure shared among multiple inbound InfiniBand queue pairs and one or more outbound communication ports, according to one embodiment of the invention.

In operation 802, an InfiniBand packet is received at a channel adapter of a device coupled to an InfiniBand fabric and an external communication system (e.g., an Ethernet network), and is validated according to the InfiniBand specification. This embodiment may be particularly suited for processing InfiniBand Send commands that comprise encapsulated communications (e.g., Ethernet packets). Alternatively, the packet may contain a response to an RDMA Read operation or some other content to be reassembled into an outbound communication.

In operation 804, the virtual lane and queue pair on which the InfiniBand packet was received are identified. Illustratively, the service level associated with the packet's virtual lane may affect the QoS afforded the Ethernet packet when it is transmitted on one of the outbound ports.

In operation 806, an InfiniBand resource manager or other module determines whether there is space for the packet's payload in the shared memory structure. In particular, the resource manager may determine whether storing the payload would exceed the memory (e.g., buckets) allocated or available to the packet's virtual lane or queue pair.

As described in a previous section, various parameters may be maintained to reflect the amount of storage space used by a virtual lane or queue pair, the amount of space dedicated to a virtual lane or queue pair, the amount of shared space available, whether a virtual lane or queue pair is permitted to use the shared space, etc. If the payload cannot be accommodated, the packet is dropped and/or an RNR-NAK notification is sent to the other end of the connection, and the illustrated method ends.

In operation 808, the payload of the InfiniBand packet is stored in the shared memory structure. To find the location where the payload should be stored, the linked list of memory buckets associated with the packet's queue pair is referred to. For example, a tail pointer can be followed, which points to the last bucket currently allocated to the queue pair.

In this embodiment, entries in the shared control structure for the shared memory structure contain information regarding the status of the bucket that corresponds to the entry. Thus, it can readily be determined where in a bucket the payload should be stored and whether the entire payload will fit in the bucket. Illustratively, if the payload comprises the first fragment or portion of an outbound communication, a new bucket may be used. Otherwise, the payload is stored contiguously with the previous payload for the communication.

More specifically, if a newly arrived InfiniBand packet is part of a partially reassembled outbound communication, it is used to fill the remainder of the tail bucket (i.e., the bucket pointed to by the linked list's tail pointer). If the tail bucket is full, or the InfiniBand packet is part of a new message, then a new bucket is started. In this case, the new bucket is pointed to by the address in the control structure pointed to by the tail pointer, and the new bucket becomes the new tail bucket.

As described above, the first bucket for a new communication may be prepared by first storing information that will facilitate mapping of the communication to an external port and reclamation of the used memory buckets.

Also in operation 808, the queue pair's linked list is updated as necessary. For example, if a new memory bucket is needed to accommodate the payload, the bucket and a new corresponding entry in the control structure are initialized as necessary and added to the queue pair's linked list.

In operation 810, depth indicators (e.g., pointers, counters) are updated as necessary to indicate how much traffic is currently stored in the shared memory for the queue pair and/or the associated virtual lane. Illustratively, these parameters are maintained by the resource manager.

In operation 812, it is determined whether a full outbound communication (e.g., Ethernet packet, Packet Over SONET/SDH) has been reassembled. If so, the illustrated method advances to operation 814; otherwise, the method returns to operation 802 to accept another InfiniBand packet, for the same or a different queue pair.

In operation 814, the sub-list (of the queue pair's linked list) is identified and posted or copied to the linked list structure corresponding to the outbound port through which the completed communication will be transmitted. The sub-list comprises a set of linked memory buckets and corresponding control entries.

To facilitate this re-mapping of the sub-list, pointers to the first and last elements of the sub-list may be passed from the InfiniBand receive module (IRX) to the network transmit module (NTX) after the last portion of the communication is reassembled. These pointers will identify the first control entry and memory bucket and the last control entry and memory bucket. In the illustrated method, the sub-list is not yet removed from the queue pair's linked list.

In operation 816, the outbound port or the NTX links the sub-list to a linked list for the appropriate outbound queue of the external port.

In operation 818, the outbound port transmits the communication. Various processing may be performed before the transmission (e.g., checksum calculation, adding headers, VLAN ID insertion) by the NTX and MAC (Media Access Control) module or other component(s).

In operation 820, the outbound port (NTX) releases the control entries and memory buckets corresponding to the communication (e.g., back to the IRM). Illustratively, control entries may include flags or other indicators revealing whether a control entry (and/or associated memory bucket) is currently used by an outbound port. The flags will be reset when the associated memory buckets are reclaimed.

In operation 822, the control entries and memory buckets are released from the queue pair and returned to the free list. The memory buckets and/or control entries may be flushed to clear their contents.

In operation 824, depth indicators for the queue pair (and/or virtual lane) through which the communication was received are updated to reflect the release of the sub-list.

In operation 826, queue pair and/or virtual lane credits may be issued, if possible, depending on how much traffic in the shared memory structure now corresponds to the queue pair and virtual lane (e.g., the queue pair or virtual lane depth and the dedicated or shared thresholds). The issuance of credits may also depend upon how many free buckets are available, how many buckets may be reserved for other queue pairs, how many credits have been issued by other queue pairs and/or virtual lanes, etc.

For example, and as described in a previous section, a queue pair may or may not be allocated a number of dedicated memory buckets, and may or may not be permitted to use a pool of shared buckets. Thresholds may be defined within the dedicated and/or shared sets of buckets. Different numbers of message credits may be advertisable as a number of buckets used by a queue pair meets or exceeds each threshold level of buckets. Thus, to determine if (and how many) message credits the queue pair can now advertise, the resource manager (or other module) may compare the present number of buckets used by the queue pair with applicable thresholds.

Interleaving Sends and RDMA Read Responses in a Single Receive Queue

In one embodiment of the invention, an InfiniBand queue pair's receive queue receives and interleaves different types of traffic at a channel adapter. For example, the queue may receive Send commands that convey encapsulated outbound communications (e.g., Ethernet packets). Each Send command may comprise any number of individual InfiniBand packets, the payloads of which are re-assembled in the queue to form the communication.

The queue may also receive Send commands that convey one or more RDMA Read descriptors. When processed, the descriptors are used to configure RDMA Read requests from the channel adapter to the host that originated the Send command. In response, the host sends RDMA Read responses conveying portions of an outbound communication to be assembled and transmitted by the channel adapter.

Illustratively, the queue pair queue may be implemented as a series of linked buckets in a shared memory structure, as described in preceding sections. In other embodiments, the queue may be implemented in other ways, and may be configured to store traffic other than InfiniBand Sends and Reads, such as PCI Express communications, Asynchronous Transfer Mode (ATM) traffic, Fibre Channel transactions, etc.

Figure 9:
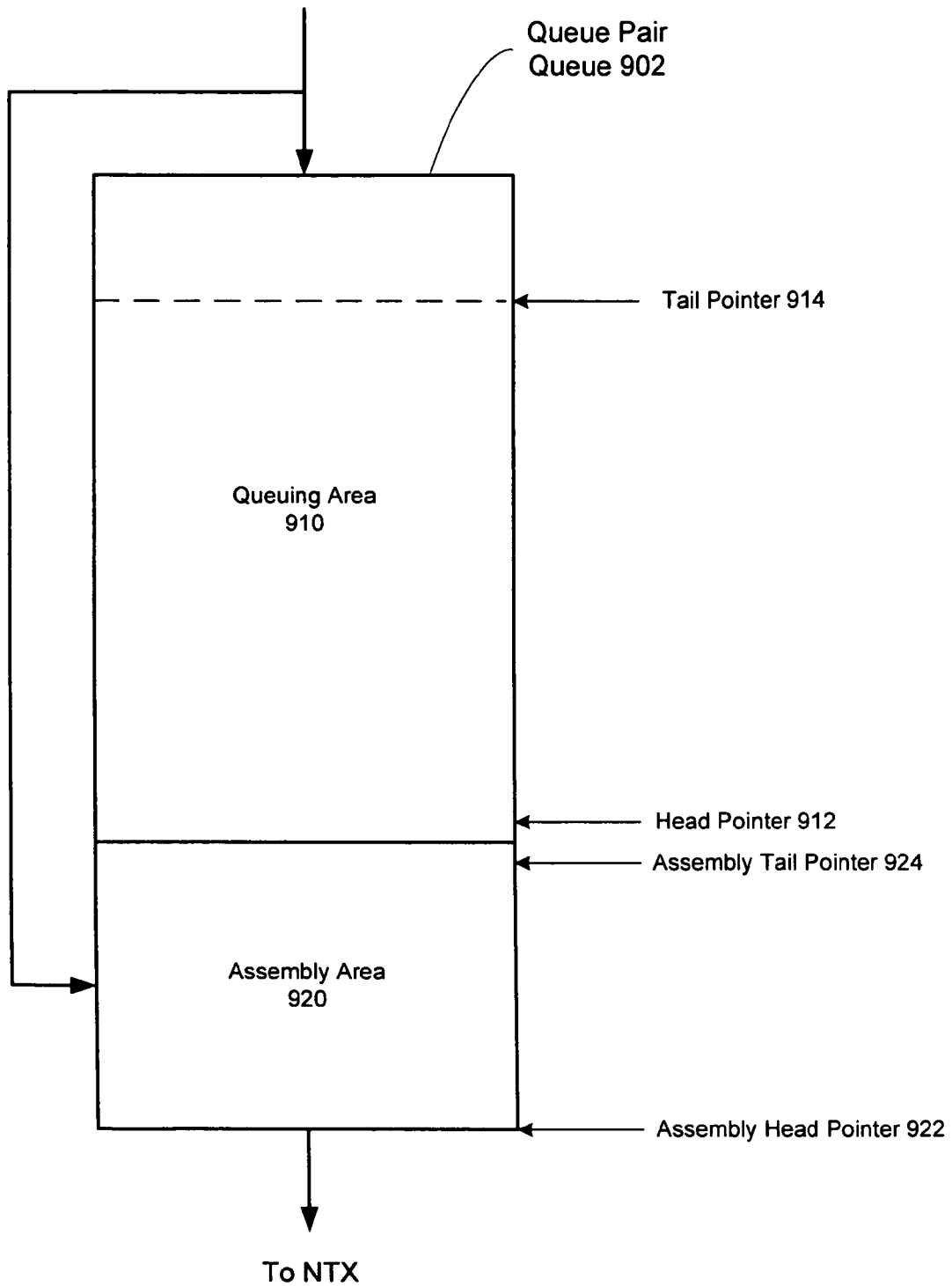
FIG. 9 is a block diagram of a queue pair queue configured to accommodate mixed types of traffic without causing out-of-order receipt, according to one embodiment of the invention.

FIG. 9 depicts a queue pair queue as it may be configured to store and facilitate the processing of mixed InfiniBand receive traffic, in one embodiment of the invention. In this embodiment, queue pair queue 902 may be conceptually viewed as comprising a single queue, and may be treated as a single queue for flow control purposes. However, in this embodiment of the invention, queue 902 comprises multiple linked lists, each with a head and tail pointer.

Thus, queuing area 910 is where new InfiniBand Send command packets are received and queued for processing (e.g., for reassembly or forwarding of the outbound communication corresponding to the Send command). Queuing area 910 has associated head pointer 912 and tail pointer 914. Tail pointer 914 identifies a tail of the queue, which may indicate where the next new content (e.g., new Send command) is to be stored.

Assembly (or reassembly) area 920 is where outbound communications are assembled (or reassembled) from portions received via separate InfiniBand packets (e.g., Send commands encapsulating an outbound communication, responses to RDMA Read requests). The assembly area is managed with the aid of assembly head pointer 922 and assembly tail pointer 924. The head of the assembly area of queue 902 coincides with the first bucket of the next communication to be passed to a Network Transmit (NTX) module.

Queuing area 910 and/or assembly area 920 may be expanded by drawing upon a free list of buffers; as buffers are used in queue 902, they are returned to the free list (e.g., after their corresponding outbound communications have been transmitted).

In the illustrated embodiment of the invention, head pointer 912 identifies the entry or element (e.g., the next Send command) in queue 902 that corresponds to the next outbound communication to be assembled, reassembled or passed forward.

In this embodiment of the invention, new Send commands (encapsulating an outbound communication or a set of RDMA Read descriptors) are enqueued at tail pointer 914 of the queuing area of queue pair queue 902. As Send command packets are processed or dispatched from the queuing area to the assembly area, head pointer 912 is adjusted accordingly. As reassembled communications are forwarded to the NTX module, assembly head 922 and assembly tail 924 are advanced as needed.

When head pointer 912 is advanced to a new command in queuing area 910, the following action depends on which type of traffic the command is. If it is a Send command encapsulating an outbound communication, the communication should be fully re-assembled by the time the head pointer gets to the command. If so, then the communication can simply be passed to the NTX module. This may be done by forwarding pointers identifying the beginning and end of the communication, as described in a previous section. The buckets containing the communication are then unlinked from queue pair queue 902 and added to the external port's queue.

If the command identified by the next packet pointer is a Send command encapsulating a set of RDMA Read descriptors, the Read descriptors are retrieved and corresponding RDMA Read requests are issued. As they are received, the resulting RDMA Read responses bypass the tail of the queue and are stored directly in assembly area 920. Buckets may be added to the tail end of the assembly area of the queue as necessary to accommodate the responses.

Thus, queuing area 910 and assembly area 920 may be seen as separate queues or sub-queues. However, the last bucket of assembly area 920 may reference head pointer 912 or the first bucket of queuing area 910.

Figure 10:
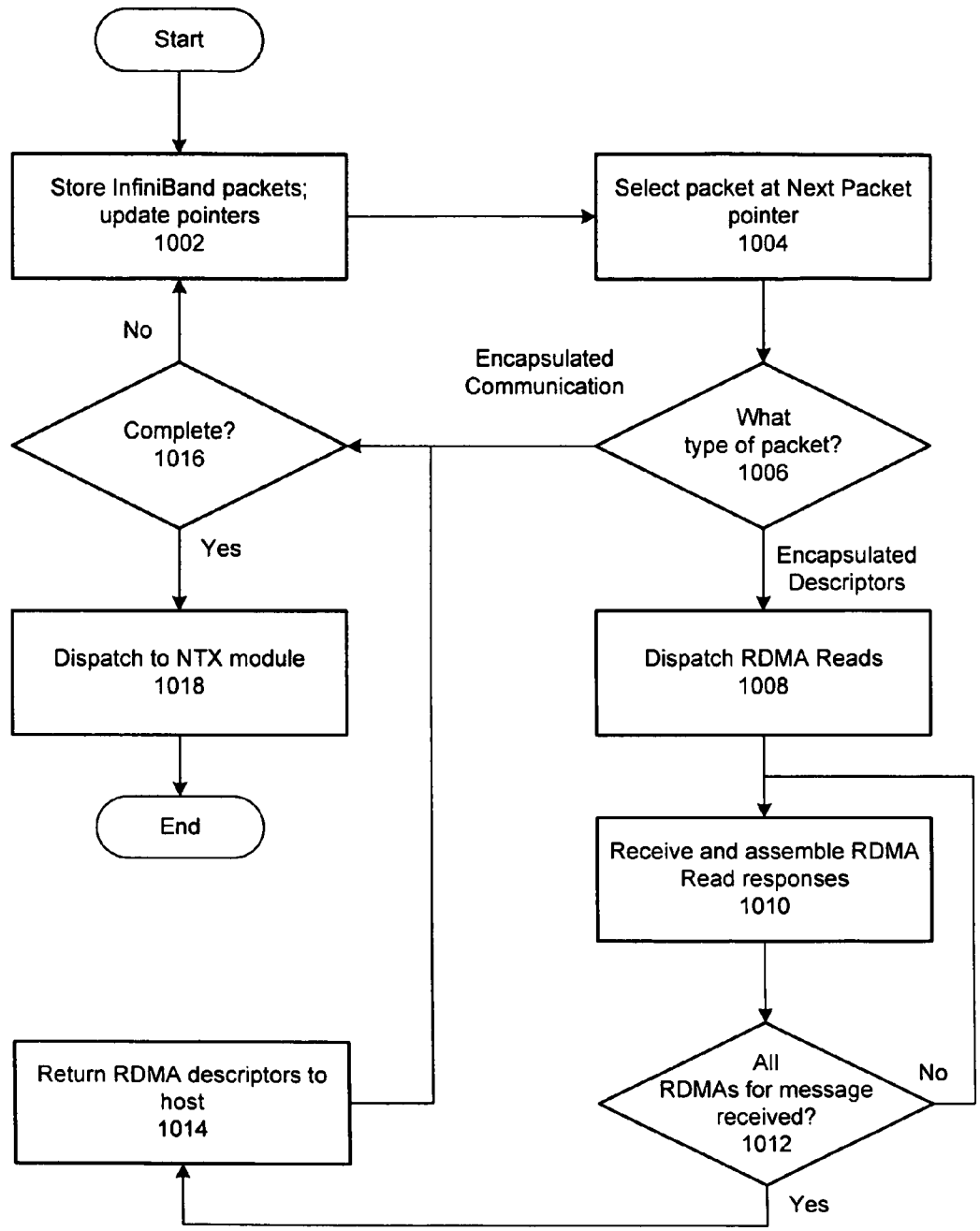
FIG. 10 is a flowchart illustrating one method of processing traffic received in the queue pair queue of FIG. 9, according to one embodiment of the invention.

FIG. 10 demonstrates in greater detail a method of handling mixed InfiniBand receive traffic (e.g., Sends and RDMA Read responses) in a single queue pair receive queue.

In operation 1002, InfiniBand Send packets conveying various content are stored in the queue. Head, tail and/or other pointers of the queuing area of the queue (e.g., a next packet pointer) are updated accordingly. Illustratively, most or all information other than the payloads is stripped from the InfiniBand packets before they are enqueued. The information that is stripped off may include one or more headers, CRCs, etc.

In one embodiment of the invention, each section of the queue pair queue has a first and last pointer configured to identify the beginning (e.g., first memory bucket) and end (e.g., last bucket) of the section. These pointers may facilitate the transfer of communications and other content, and may overlap or be separate from the head, tail and next packet pointers discussed above.

In operation 1004, the next packet pointer is advanced to a queue entry containing an unprocessed command or packet. The queue entry may comprise one or more memory buckets.

In operation 1006, the type of command or traffic is identified. This may be done by reading a sufficient portion of the command or packet. For example, the payload of the first InfiniBand packet conveying a new command may include meta-data, a proprietary header or other information indicating what the command is.

If the command is an encapsulated Send (i.e., a Send command conveying an encapsulated outbound communication), the method advances to operation 1012. If the command is a Send command conveying one or more RDMA Read descriptors, the illustrated method continues at operation 1008.

In operation 1008, the RDMA Read descriptors are identified and corresponding RDMA Read requests are issued to the specified host (e.g., one Read request per descriptor) to retrieve the content of a communication. In addition, one or more buckets may be appended to the assembly area of the queue pair queue, if needed (e.g., based on the expected size of the communication).

In operation 1010, RDMA Read responses, corresponding to the RDMA Read requests and containing portions of the communication, are received and assembled in the assembly area of the queue. The communication portions may be shifted or adjusted as necessary to store them contiguously. This may also require one or more queue pointers to be updated.

In operation 1012, it is determined whether all RDMA Read responses have been received for the current communication. If so, the method continues with operation 1014; otherwise, the method returns to 1010 to continue receiving the responses.

In operation 1014, the RDMA descriptors are returned.

In operation 1016, it is determined whether the communication is complete (i.e., completely assembled or re-assembled). If not, the illustrated method returns to operation 1002. While the communication is being assembled or reassembled, a checksum may be calculated. The checksum, checksum offset and/or other information useful for further processing of the communication (e.g., external port number, quality of service) may be stored in front of the communication (e.g., the first lines of the first bucket) for use by the NTX module.

In operation 1018, the completed communication is dispatched to the NTX module. Illustratively, the first and last pointers of the assembly area are used to unlink the completed communication's buckets from the queue pair queue and link them to the corresponding external port or a particular queue of the external port. Queue pointers are updated as needed, and the illustrated procedure then ends.

Tracking Responses to an RDMA Read Operation

In one embodiment of the invention, responses to an RDMA Read operation are tracked in the channel adapter that issued the operation. Illustratively, for each queue pair or other communication connection in which RDMA Reads are performed, a linked list or other structure (e.g. a FIFO) is maintained. A single memory structure may be employed, in which the linked lists may be interleaved.

In this embodiment, each entry in a queue pair's linked list identifies the range of Packet Sequence Numbers (PSN) associated with the expected responses to one RDMA Read operation. Each entry also includes a link to the next entry in the list, and may also store the PSN of the most recently received response. When the last response is received, the entry may be removed, and a retry queue entry corresponding to the RDMA Read may be retired. However, if a response is received out of order, the retry queue entry may be used to retry the RDMA Read.

Figure 11:
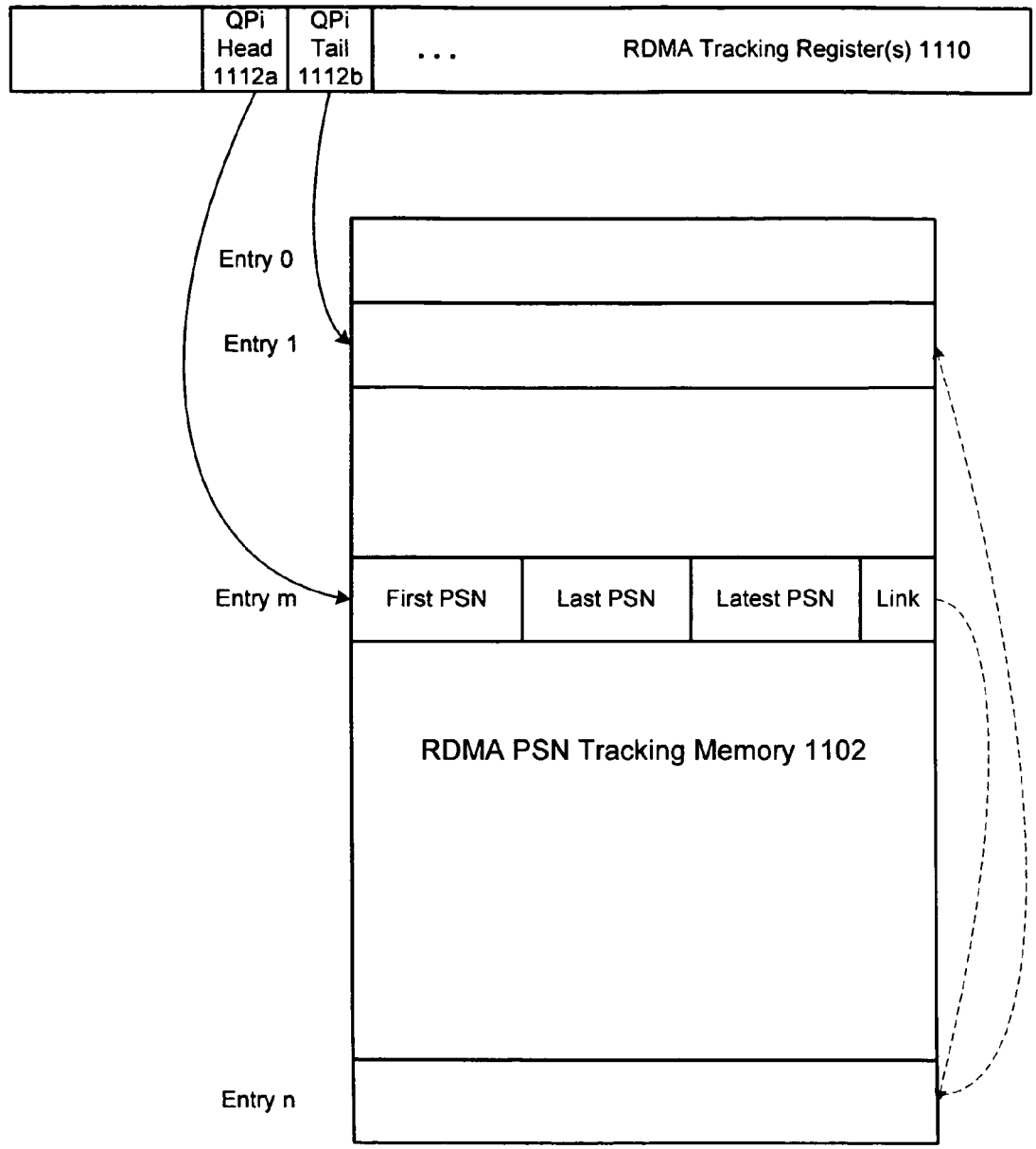
FIG. 11 is a block diagram of a memory structure for maintaining linked lists for tracking receipt of responses to RDMA Read operations, according to one embodiment of the invention.

FIG. 11 depicts a memory structure for maintaining the linked lists in a channel adapter, according to one embodiment of the invention. In this embodiment, RDMA PSN tracking memory 1102 includes any number of entries. The size of memory 1102, and number of entries, may depend upon factors such as the number of queue pairs established on the channel adapter, the number of queue pairs enabled to perform RDMA Read operations, the average or expected number of RDMA Reads, the estimated period of time needed to complete an RDMA Read, etc.

RDMA PSN tracking memory 1102 may include virtually any number of linked lists, but can accommodate one linked list for every active queue pair that performs an RDMA Read operation.

Memory 1102 of FIG. 11 includes one linked list, which starts with entry m and also includes entries n and 1. Each entry corresponds to a single RDMA Read operation. Each entry may be configured as shown for entry m, which identifies the first and last PSNs of the expected responses to the RDMA Read, the PSN of most recently received (i.e., latest) response, and a link to the next entry in the linked list.

Any entry in memory 1102 may be part of any linked list. However, a particular entry (e.g., entry 0) may be a null entry and may be used to terminate a linked list.

For each linked list in RDMA PSN tracking memory 1102, pointers are maintained to the first and last entries. These pointers may be stored in memory or registers, such as RDMA tracking registers 1110, or some other structure. Thus, in FIG. 11, QPi head pointer 1112a identifies the head of the linked list for queue pair i, while QPi tail pointer 1112b identifies the tail of the linked list.

Free entries—entries in memory 1102 not being used for any linked lists—may be organized into a free list. In FIG. 11, a free list is maintained using free head 1104a, which identifies a first free entry, and free tail 1104b, which identifies a last free entry. The free entries may be linked using the "link" field of the entries; the other fields are not used.

In other embodiments of the invention, an entry in a queue pair's linked list may contain virtually any information.

Figure 12:
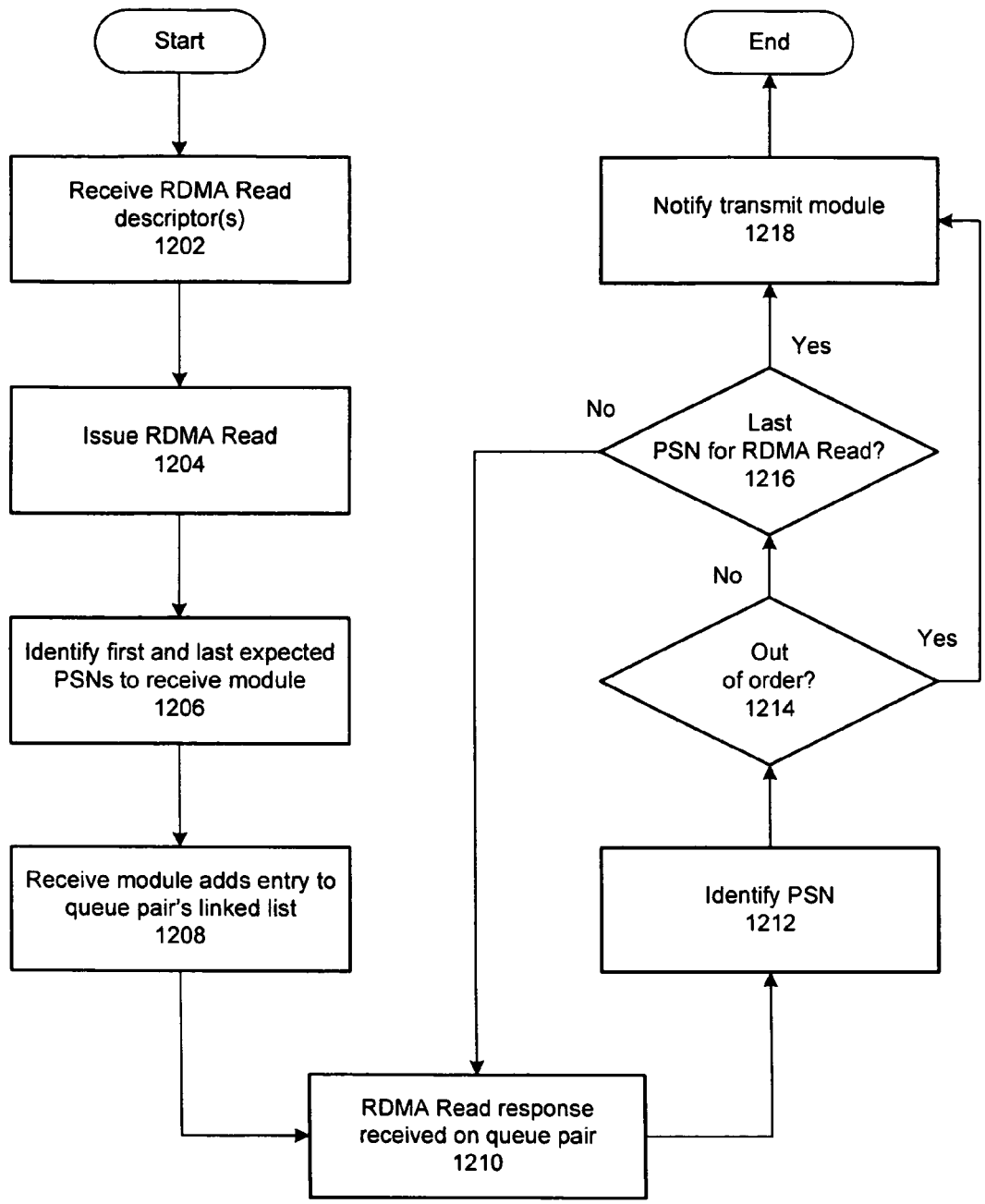
FIG. 12 is a flowchart demonstrating one method of tracking receipt of responses to RDMA Read operations, according to one embodiment of the invention.

FIG. 12 demonstrates one method of tracking responses to an RDMA Read operation using a linked list, according to one embodiment of the invention.

In operation 1202, a channel adapter (for an InfiniBand environment) or other communication interface (for some other environment) receives one or more RDMA Read descriptors. For example, a channel adapter may receive, on a particular queue pair, a Send command containing one or more RDMA Read descriptors. Each descriptor describes all or a portion of a communication (e.g., an Ethernet packet) to be retrieved from a host. In this embodiment, the queue pair is a reliable connected queue pair.

In operation 1204, a transmit module of the channel adapter eventually issues an RDMA Read operation to retrieve the communication, or communication portion, from the host. The amount of data to be retrieved may be of virtually any size. The RDMA Read operation is assigned a Packet Sequence Number (PSN) to distinguish it from other transactions conducted by the channel adapter.

In operation 1206, the number of expected responses to the RDMA Read is calculated. This may be done by dividing the amount of data to be retrieved by the MTU (Maximum Transfer Unit) size in effect for the queue pair (or other communication connection) through which the data will be retrieved. As one skilled in the art will appreciate, each response will have a different PSN, and all the responses' PSNs should be in order, from a first PSN for a first response to a last PSN for a last response. Thus, the PSNs of the expected responses can be readily ascertained. This range of PSN values is communicated to a receive module that will receive the responses.

In operation 1208, the receive module initializes or adds to a linked list (such as the linked list of FIG. 11) corresponding to the queue pair. The receive module populates a new entry in the queue pair's linked list with the range of PSNs (e.g., first and last) and a link to the next (or a null) entry in the linked list.

A "latest" field in the entry, for tracking the PSN of the most recently response, may be initialized to a null or other value.

In operation 1210, an RDMA Read response is received on the same queue pair on which the RDMA Read was issued in operation 1204. As explained in a previous section, RDMA Read responses may be received interleaved in a receive queue with other traffic (e.g., InfiniBand Sends).

In operation 1212, the PSN of the RDMA Read response is identified (e.g., by reading it from a header of the response).

In operation 1214, the PSN is examined to determine if it is out of order. If the response is for the issued RDMA Read, but is not the next expected response, the method advances to operation 1218.

In operation 1216, the PSN is in order, and a determination is made as to whether this response is the last one expected for the RDMA Read. If not, the method returns to operation 1210 to receive the next response.

Otherwise, in operation 1218, the transmit module is notified that all responses have been correctly received. Therefore, the transmit module, if it maintains a retry queue for RDMA Reads, can retire a retry queue entry corresponding to the RDMA Read issued in operation 1204.

However, if operation 1218 is reached directly from operation 1214, the transmit module is notified of the out of order receipt of a response to the RDMA Read. The transmit module may then retry the operation. In this case, the corresponding entry in the linked list may be removed in favor of the retried operation.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. In a communication device coupled to an InfiniBand network and an external communication system, a method of transferring a communication from the InfiniBand network to the external communication system, the method comprising:
   receiving packets for each of multiple queue pairs terminating at the communication device;
   for each of said queue pairs:
      reassembling in a shared memory contents of said packets into communications to be transmitted to the external communication system, wherein the memory is a single contiguous memory structure shared by multiple queue pairs and virtual lanes, and wherein a given packet payload is stored contiguously in the memory; and
      maintaining an associated linked list identifying locations in said shared single contiguous memory in which said communications are reassembled; and
   when a communication is reassembled for a first queue pair, identifying to a transmission module a portion of a first linked list associated with said first queue pair, wherein said first linked list portion identifies shared single contiguous memory locations in which said communication was reassembled.

2. The method of claim 1, further comprising:
   only after said reassembled communication is transmitted, removing said portion of said first linked list from said first linked list.

3. The method of claim 1, wherein said reassembling comprises:
   as said packets are received from the InfiniBand network, queuing said contents directly into said shared single contiguous memory;
   wherein said shared single contiguous memory serves as receive queues for each of said multiple queue pairs.

4. The method of claim 3, further comprising:
   transmitting said reassembled communication from said shared single contiguous memory;
   wherein said shared single contiguous memory serves as a transmit queue for the external communication system.

5. The method of claim 1, wherein the external communication system is an Ethernet network.

6. The method of claim 5, wherein said received packets comprise portions of encapsulated Ethernet packets.

7. The method of claim 1, wherein said identifying to a transmission module comprises transferring to the transmission module a set of pointers identifying said reassembled communication rather than transferring to the transmission module said reassembled communication.

8. The method of claim 1, wherein said identifying to a transmission module comprises identifying to the transmission module:
   a head of said portion of said first linked list; and
   a tail of said portion of said first linked list.

9. The method of claim 1, wherein said maintaining an associated linked list for said first queue pair comprises:
   maintaining a head pointer configured to identify:
      a first location in said shared single contiguous memory in which contents of a first packet are stored; and
      a first entry in a shared control structure, said first entry corresponding to said first location in said shared single contiguous memory; and
   maintaining a tail pointer configured to identify:
      a final location in said shared single contiguous memory in which contents of a final packet are stored; and
      a final entry in said shared control structure;
   wherein each entry in said shared control structure that is part of said first linked list, except for said final entry, identifies a subsequent entry in said shared control structure and identifies a location in said shared single contiguous memory corresponding to said subsequent entry.

10. The method of claim 9, further comprising:
    protecting said shared control structure by one or more of:
       separating bits of the structure to prevent double bit errors; and
       providing single error correct and double error detect protection for one or more entries in the control structure.

11. The method of claim 10, further comprising: extending the single error correct and double error detect protection to include said location in said shared single contiguous memory.

12. The method of claim 1, further comprising:
    managing said linked lists for said queue pairs with a shared control;
    wherein each said location in said shared single contiguous memory corresponds to an entry in said shared control; and
    wherein each entry in said shared control is configured to identify:
       a subsequent entry within the same linked list; and
       a location in said shared single contiguous memory corresponding to said subsequent entry.

13. A computer readable medium storing instructions that, when executed by a computer, cause the computer to perform a method of transferring a communication from an InfiniBand network to a communication system external to the InfiniBand network, the method comprising:

for each of multiple queue pairs terminating at the communication device, receiving packets;

for each of said queue pairs:

reassembling in a shared memory contents of said packets into communications to be transmitted to the external communication system, wherein the memory is a single contiguous memory structure shared by multiple queue pairs and virtual lanes, and wherein a given packet payload is stored contiguously in the memory; and maintaining an associated linked list identifying locations in said shared single contiguous memory in which said communications are reassembled; and when a communication is reassembled for a first queue pair, identifying to a transmission module a portion of a first linked list associated with said first queue pair, wherein said first linked list portion identifies shared single contiguous memory locations in which said communication was reassembled.

14. The computer readable medium of claim 13, the method further comprising:

as said packets are received from the InfiniBand network, queuing said contents directly into said shared single contiguous memory, wherein said shared single contiguous memory serves as receive queues for each of said multiple queue pairs; and transmitting said reassembled communication from said shared single contiguous memory, wherein said shared single contiguous memory also serves as a transmit queue for the external communication system.

15. The computer readable medium of claim 13, wherein said identifying to a transmission module comprises transferring to the transmission module a set of pointers identifying said reassembled communication rather than transferring to the transmission module said reassembled communication.

16. A method of storing a communication, received from an InfiniBand network, for transmission external to the InfiniBand network, the method comprising:

receiving a set of InfiniBand packets from an InfiniBand network, each said packet comprising a portion of a communication to be transmitted external to the InfiniBand network;

storing said communication portions in a single contiguous memory shared among multiple queue pairs and virtual lanes of the InfiniBand network, including a first queue pair through which said set of InfiniBand packets is received, and wherein a given packet payload is stored contiguously in the memory;

maintaining a first linked list for said first queue pair to identify locations in said single contiguous memory in which said communication portions are stored; and when all of said communication portions are stored in said single contiguous memory, scheduling said communication for transmission from said single contiguous memory.

17. The method of claim 16, wherein said storing comprises reassembling said communication portions into said communication.

18. The method of claim 16, wherein said scheduling comprises:

identifying to a transmission module a first entry in said first linked list corresponding to a location in said single contiguous memory in which a first portion of said communication is stored; and identifying to a transmission module a final entry in said first linked list corresponding to a location in said single contiguous memory in which a final portion of said communication is stored.

19. The method of claim 16, wherein said InfiniBand packets comprise Send commands conveying said portions of said first communication.

20. The method of claim 16, wherein said communication is an Ethernet packet.

21. The method of claim 16, wherein said maintaining a first linked list comprises:

maintaining a head pointer identifying:

a first entry in a control structure; and a first location in said single contiguous memory in which a first portion of said communication is stored; and maintaining a tail pointer identifying:

a final entry in said control structure; and a final location in said single contiguous memory in which a final portion of said communication is stored;

wherein said first entry is linked to said final entry by zero or more intermediate entries in said control structure, each said intermediate entry corresponding to an intermediate location in said single contiguous memory in which a portion of said communication is stored.

22. The method of claim 21, further comprising:

updating said first linked list to remove said first entry, said final entry and said intermediate entries from said first linked list only after said communication is transmitted.

23. The method of claim 16, wherein said maintaining a first linked list comprises:

in a control structure, maintaining a first linked list of control entries, wherein each of said control entries except a final control entry identifies:

a subsequent control entry; and corresponding to said subsequent control entry, a location in said single contiguous memory in which data received through said first queue pair are stored.

24. The method of claim 23, wherein said control structure and said single contiguous memory are separate physical memory structures.

25. The method of claim 24, wherein said control structure and said single contiguous memory employ common addressing via said first linked list.

26. The method of claim 23, wherein said maintaining further comprises:

maintaining a head pointer identifying a first control entry in said first linked list and a first location in said single contiguous memory; and maintaining a tail pointer identifying said final control entry in said first linked list and a final location in said single contiguous memory.

27. The method of claim 23, further comprising:

identifying to a transmission module a sub-list of said first linked list of control entries, wherein said sub-list includes control entries corresponding to all locations in said single contiguous memory in which portions of said communication are stored.

28. The method of claim 27, further comprising:

removing said sub-list of control entries from said first linked list only after said communication is transmitted.

29. A computer readable medium storing instructions that, when executed by a computer, cause the computer to perform a method of storing a communication, received from an InfiniBand network, for transmission external to the InfiniBand network, the method comprising:

receiving a set of InfiniBand packets from an InfiniBand network, each said packet comprising a portion of a communication to be transmitted external to the InfiniBand network;

storing said communication portions in a single contiguous memory shared among multiple queue pairs and virtual lanes of the InfiniBand network, including a first queue pair through which said set of InfiniBand packets is received, wherein a given packet payloads is stored contiguously in the memory;

maintaining a first linked list for said first queue pair to identify locations in said single contiguous memory in which said communication portions are stored; and when all of said communication portions are stored in said single contiguous memory, scheduling said communication for transmission from said single contiguous memory.

30. The computer readable medium of claim 29, wherein said scheduling comprises:
identifying to a transmission module a first entry in said first linked list corresponding to a location in said single contiguous memory in which a first portion of said communication is stored; and
identifying to a transmission module a final entry in said first linked list corresponding to a location in said single contiguous memory in which a final portion of said communication is stored.

31. The computer readable medium of claim 29, wherein said maintaining a first linked list comprises:
in a control structure, maintaining a first linked list of control entries, wherein each of said control entries except a final control entry identifies:
a subsequent control entry; and
corresponding to said subsequent control entry, a location in said single contiguous memory in which data received through said first queue pair are stored;
maintaining a head pointer identifying a first control entry in said first linked list and a first location in said single contiguous memory; and
maintaining a tail pointer identifying said final control entry in said first linked list and a final location in said single contiguous memory.

32. The computer readable medium of claim 31, wherein the method further comprises:
identifying to a transmission module a sub-list of said first linked list of control entries, wherein said sub-list includes control entries corresponding to all locations in said single contiguous memory in which portions of said communication are stored.

33. The computer readable medium of claim 32, wherein the method further comprises:
removing said sub-list of control entries from said first linked list only after said communication is transmitted.

34. A computer readable memory structure configured for simultaneously queuing contents of packets as they are received from an InfiniBand network and storing communications reassembled from said contents for transmission external to the InfiniBand network, the memory structure comprising:
a single contiguous memory shared by multiple queue pairs and virtual lanes, comprising:
for each of a plurality of InfiniBand communication connections, memory buckets for storing contents of packets received on the communication connection, wherein a given packet payload is stored contiguously in the memory within and across the buckets;
wherein said contents of said packets are reassembled into communications in said memory buckets as said contents are stored; a shared control, comprising:
for each of said communication connections, a linked list of control entries, wherein each said control entry is configured to identify:
a subsequent control entry in said linked list; and
in said shared single contiguous memory, a memory bucket corresponding to said subsequent control entry;
wherein said shared single contiguous memory and said shared control are configured for access by:
an InfiniBand receive module configured to receive said packets; and
a transmit module configured to transmit said communications external to the InfiniBand network.

35. The computer readable memory structure of claim 34, wherein said shared control further comprises:
a linked list of free entries, wherein each said free entry is configured to identify, in said shared single contiguous memory, a free memory bucket.

36. The computer readable memory structure of claim 34, wherein said shared control is protected by one or more of:
separating bits of the structure to prevent double bit errors; and
providing single error correct and double error detect protection for one or more control entries in the shared control.

37. The computer readable memory structure of claim 36, wherein a control entry in said shared control is further protected by extending the single error correct and double error detect protection to include the identity of a memory bucket in said shared single contiguous memory.

38. An apparatus for storing data received from an InfiniBand network, for transfer to an external communication system, comprising:
an InfiniBand receive module configured to receive packets from a plurality of InfiniBand communication connections;
a transmit module configured to transmit communications to a communication system external to the InfiniBand network via one or more outbound ports;
a single contiguous memory shared between said InfiniBand receive module and said transmit module, wherein a given packet payload is stored contiguously in the memory; and
a control, shared between said InfiniBand receive module and said transmit module, for maintaining a linked list for each of said communication connections and for each of the outbound ports.

39. The apparatus of claim 38, further comprising, for each said communication connection:
a head pointer identifying a head of said linked list for said communication connection; and
a tail pointer identifying a tail of said linked list for said communication connection.

40. The apparatus of claim 38, further comprising, for each of the outbound ports:
a head pointer identifying a head of said linked list for the outbound port; and
a tail pointer identifying a tail of said linked list for the outbound port.

41. The apparatus of claim 40, further comprising, for each outbound queue of each of the outbound ports:
a head pointer identifying a head of said linked list for the outbound queue; and a tail pointer identifying a tail of said linked list for the outbound queue.

42. The apparatus of claim 38, wherein said communication connections are queue pairs.

43. The apparatus of claim 38, wherein said communication connections are virtual lanes.

44. The apparatus of claim 38, wherein the external communication system comprises an Ethernet network.

45. The apparatus of claim 38, wherein the external communication system comprises a SONET network.

* * * * *